United States Patent
Wang et al.

(10) Patent No.: US 12,204,859 B2
(45) Date of Patent: Jan. 21, 2025

(54) TEXT PROCESSING METHOD, MODEL TRAINING METHOD, AND APPARATUS

(71) Applicants: Huawei Technologies Co., Ltd., Shenzhen (CN); TSINGHUA UNIVERSITY, Beijing (CN)

(72) Inventors: Yasheng Wang, Shenzhen (CN); Xin Jiang, Hong Kong (CN); Xiao Chen, Hong Kong (CN); Qun Liu, Hong Kong (CN); Zhengyan Zhang, Beijing (CN); Fanchao Qi, Beijing (CN); Zhiyuan Liu, Beijing (CN)

(73) Assignees: Huawei Technologies Co., Ltd., Shenzhen (CN); TSINGHUA UNIVERSITY, Beijing (CN)

( * ) Notice: Subject to any disclaimer, the term of this patent is extended or adjusted under 35 U.S.C. 154(b) by 499 days.

(21) Appl. No.: 17/526,832

(22) Filed: Nov. 15, 2021

(65) Prior Publication Data

US 2022/0147715 A1  May 12, 2022

Related U.S. Application Data

(63) Continuation of application No. PCT/CN2020/072588, filed on Jan. 17, 2020.

(30) Foreign Application Priority Data

May 16, 2019 (CN) .......................... 201910410679.4

(51) Int. Cl.
*G06F 40/295* (2020.01)
*G06F 40/211* (2020.01)
(Continued)

(52) U.S. Cl.
CPC .......... *G06F 40/295* (2020.01); *G06F 40/211* (2020.01); *G06F 40/30* (2020.01);
(Continued)

(58) Field of Classification Search
None
See application file for complete search history.

(56) References Cited

U.S. PATENT DOCUMENTS

| 9,679,558 | B2  | 6/2017 | Akbacak et al. |
| 10,073,840 | B2 * | 9/2018 | Hakkani-Tur .......... G06F 40/40 |
| | | | (Continued) |

FOREIGN PATENT DOCUMENTS

| CA | 3069185 | 1/2019 |
| CN | 107102989 A | 8/2017 |
| | (Continued) | |

OTHER PUBLICATIONS

EPO search opinions for EP 20804954.4 (Year: 2023).*
(Continued)

*Primary Examiner* — Richard Z Zhu
(74) *Attorney, Agent, or Firm* — Leydig, Voit & Mayer, Ltd.

(57) ABSTRACT

A text processing method, a model training method, and an apparatus related to the field of artificial intelligence is provided. The method includes: obtaining target knowledge data; processing the target knowledge data to obtain a target knowledge vector; processing to-be-processed text to obtain a target text vector; fusing the target text vector and the target knowledge vector based on a target fusion model, to obtain a fused target text vector and a fused target knowledge vector; and processing the fused target text vector and/or the fused target knowledge vector based on a target processing model, to obtain a processing result corresponding to a target task. The foregoing technical solution can improve accuracy of a result of processing a target task by the target processing model.

13 Claims, 12 Drawing Sheets

(51) Int. Cl.
- *G06F 40/30* (2020.01)
- *G06F 40/237* (2020.01)
- *G06F 40/279* (2020.01)
- *G06F 40/284* (2020.01)

(52) U.S. Cl.
CPC .......... *G06F 40/237* (2020.01); *G06F 40/279* (2020.01); *G06F 40/284* (2020.01)

(56) References Cited

U.S. PATENT DOCUMENTS

| | | | | |
|---|---|---|---|---|
| 10,268,679 B2* | 4/2019 | Li | .................... | G10L 15/063 |
| 11,270,212 B2* | 3/2022 | Ding | .................... | G06N 3/045 |
| 11,341,417 B2* | 5/2022 | Minervini | .................... | G06F 40/30 |
| 2011/0270604 A1* | 11/2011 | Qi | .................... | G06F 40/30 |
| | | | | 704/9 |
| 2015/0340024 A1 | 11/2015 | Schogol et al. | | |
| 2018/0276525 A1* | 9/2018 | Jiang | .................... | G06N 3/084 |

FOREIGN PATENT DOCUMENTS

| | | | | | |
|---|---|---|---|---|---|
| CN | 107391623 | A | | 11/2017 | |
| CN | 107977361 | A | | 5/2018 | |
| CN | 108509479 | A | | 9/2018 | |
| CN | 108563637 | A | * | 9/2018 | .......... G06F 17/278 |
| CN | 108563653 | A | | 9/2018 | |
| CN | 108595708 | A | * | 9/2018 | |
| CN | 108984745 | A | | 12/2018 | |
| CN | 109033129 | A | | 12/2018 | |
| CN | 109597856 | A | | 4/2019 | |
| CN | 110232186 | A | * | 9/2019 | |
| CN | 110263324 | A | | 9/2019 | |
| WO | WO-2017092380 | A1 | * | 6/2017 | .......... G06F 16/3329 |
| WO | 2017192194 | A2 | | 11/2017 | |

OTHER PUBLICATIONS

SIPO search opinion for CN 201910410679.4 (Year: 2023).*
English translations of CN 110232186 A (Year: 2019).*
English translations of CN 108595708 A (Year: 2018).*
English translation of CN 108563637 A (Year: 2018).*
English translation of CN-108595708-A. (Year: 2018).*
SIPO Office Action dated Jun. 23, 2020 for parent application CN201910410679.4. (Year: 2020).*
Li Jianfeng et al.,"Research on Chinese Named Entity Recognition With External Knowledge and Application in Medical Field," total 72 pages (Jun. 2016). With English abstract.
Devlin et al.,"BERT: Pre-training of Deep Bidirectional Transformers for Language Understanding," total 16 pages (May 24, 2019).
Sun et al., "ERNIE: Enhanced Representation through Knowledge Integration," total 8pages (Apr. 19, 2019).
Han et al., "Neural Knowledge Acquisition via Mutual Attention between Knowledge Graph and Text," The Thirty-Second AAAI Conference on Artificial Intelligence (AAAI-18), pp. 4832-4839, XP055908171 (Feb. 2018).
Zhang et al., "ERNIE: Enhanced Language Representation with Informative Entities," arXiv:1905.07129v1 [cs.CL], Total 10 pages, XP055922778 (May 17, 2019).
Sun et al., "Open Domain Question Answering Using Early Fusion of Knowledge Bases and Text," arXiv:1809.00782v1 [cs.CL], Total 12 pages, XP080913293 (Sep. 4, 2018).

* cited by examiner

TEXT PROCESSING METHOD, MODEL TRAINING METHOD, AND APPARATUS

CROSS-REFERENCE TO RELATED APPLICATIONS

This application is a continuation of International Application No. PCT/CN2020/072588, filed on Jan. 17, 2020, which claims priority to Chinese Patent Application No. 201910410679.4, filed on May 16, 2019. The disclosures of the aforementioned applications are hereby incorporated by reference in their entireties.

TECHNICAL FIELD

This application relates to the natural language processing field, and more specifically, to a text processing method, a model training method, and an apparatus.

BACKGROUND

Artificial intelligence (AI) is a theory, a method, a technology, or an application system that simulates, extends, and expands human intelligence by using a digital computer or a machine controlled by a digital computer, to sense an environment, obtain knowledge, and achieve an optimal result by using the knowledge. In other words, artificial intelligence is a branch of computer science, and is intended to understand the essence of intelligence and produce a new intelligent machine that can react in a manner similar to human intelligence. Artificial intelligence is to study design principles and implementation methods of various intelligent machines, so that the machines have perceiving, inference, and decision-making functions.

With continuous development of artificial intelligence technologies, a natural language human-machine interaction system that enables human-machine interaction to be performed by using a natural language becomes increasingly important. The system needs to recognize specific meanings of a human natural language, to enable the human-machine interaction to be performed by using the natural language. Usually, the system extracts key information from a natural language sentence to recognize a specific meaning of the sentence.

With rapid development of a natural language text processing technology, a natural language human-machine interaction system can learn rich semantic patterns and semantic information from the human natural language, to use the semantic patterns and the semantic information in a natural language processing task. However, the natural language human-machine interaction system learns only a meaning of the language, and has an inadequate capability of understanding the human natural language. Consequently, accuracy is low when the natural language human-machine interaction system processes the natural language processing task.

SUMMARY

This application provides a text processing method, a model training method, and an apparatus, to improve a capability of understanding a text language by a model, and improve accuracy of a result of processing a target task by a target processing model.

According to a first aspect, a text processing method is provided, including: obtaining target knowledge data, where the target knowledge data includes a first named entity, a second named entity, and an association between the first named entity and the second named entity; processing the target knowledge data to obtain a target knowledge vector, where the target knowledge vector includes a vector corresponding to the first named entity, a vector corresponding to the second named entity, and a vector corresponding to the association between the first named entity and the second named entity; processing to-be-processed text to obtain a target text vector, where the to-be-processed text includes one or more named entities, and the one or more named entities include the first named entity; fusing the target text vector and the target knowledge vector based on a target fusion model, to obtain a fused target text vector and a fused target knowledge vector; and processing the fused target text vector and/or the fused target knowledge vector based on a target processing model, to obtain a processing result corresponding to a target task.

According to the solution provided in this application, the target fusion model fuses the target text vector corresponding to the to-be-processed text and the target knowledge vector corresponding to the target knowledge data, and uses the obtained fused target text vector and/or the obtained fused target knowledge vector as input data for the target processing model. Because knowledge is fused into the to-be-processed text, the input data for the target processing model is more accurate. This can improve a capability of understanding the to-be-processed text by the target processing model, and improve accuracy of the processing result of the target task.

It should be understood that the fused target text vector is a to-be-processed text vector.

With reference to the first aspect, in a possible implementation, the to-be-processed text further includes at least one first knowledge identifier, the at least one first knowledge identifier is used to indicate at least one named entity in the one or more named entities in the to-be-processed text, and the at least one first knowledge identifier is in a one-to-one correspondence with the at least one named entity in the to-be-processed text.

It should be understood that the fused target text vector includes at least one first knowledge identifier vector corresponding to the at least one first knowledge identifier, and the at least one first knowledge identifier vector is used to indicate a vector corresponding to the at least one named entity in the to-be-processed text.

Optionally, the processing the fused target text vector and/or the fused target knowledge vector based on a target processing model, to obtain a processing result corresponding to a target task includes: processing, based on the target processing model, the vector that corresponds to the at least one named entity in the to-be-processed text and that is indicated by the at least one first knowledge identifier vector, to obtain the processing result corresponding to the target task.

By setting, in the to-be-processed text, the first knowledge identifier used to indicate the named entity, the target processing model can be guided to inject knowledge and semantic information into the first knowledge identifier, and the model can be guided to focus on the named entity indicated by the first identifier or extract a local knowledge feature. In this way, processing efficiency and accuracy of the target processing model are improved.

With reference to the first aspect, in a possible implementation, the fused target text vector includes at least a part of information in the target knowledge data, and the fused target knowledge vector includes semantic background information of the to-be-processed text.

With reference to the first aspect, in a possible implementation, the association between the first named entity and the second named entity is a relation between the first named entity and the second named entity; or the association between the first named entity and the second named entity is an attribute of the first named entity, and the second named entity is an attribute value of the attribute.

With reference to the first aspect, in a possible implementation, the target fusion model is any one of the following models: a multilayer self-attention model, a multilayer perceptron model, a recurrent neural network model, a weight model, a convolutional neural network model, a generative adversarial network model, and a reinforcement learning neural network model.

With reference to the first aspect, in a possible implementation, the method further includes: obtaining first knowledge data, where the first knowledge data includes a third named entity, a fourth named entity, and an association between the third named entity and the fourth named entity, and the target knowledge data includes the first knowledge data; processing the first knowledge data to obtain a first knowledge vector, where the first knowledge vector includes a vector corresponding to the third named entity, a vector corresponding to the fourth named entity, and a vector corresponding to the association between the third named entity and the fourth named entity; obtaining training text and a first task result that corresponds to the training text and the target task, where the training text includes one or more named entities, and the one or more named entities include the third named entity; processing the training text to obtain a first text vector; fusing the first text vector and the first knowledge vector based on an original fusion model, to obtain a fused first text vector and a fused first knowledge vector; processing the fused first text vector and/or the fused first knowledge vector based on an original processing model, to obtain a second task result; and adjusting parameters of the original processing model based on the first task result and the second task result, to obtain the target processing model; and/or adjusting parameters of the original fusion model based on the first task result and the second task result, to obtain the target fusion model.

In a target processing model training process, the parameters of the original processing model and/or the parameters of the original fusion model are adjusted based on the first knowledge data and the training text, to obtain the target processing model and/or the target fusion model. This improves a capability of understanding natural language by the target processing model and/or the target fusion model, and improves accuracy of the processing result of the target processing model.

With reference to the first aspect, in a possible implementation, the fused first text vector includes at least a part of information in the first knowledge data, and the fused first knowledge vector includes semantic background information of the training text.

After the first text vector and the first knowledge vector are fused, the first text vector is fused with knowledge information, and the first knowledge vector is fused with semantic background information. This helps the model understand a text language.

With reference to the first aspect, in a possible implementation, the training text further includes at least one second knowledge identifier, the at least one second knowledge identifier is used to indicate at least one named entity in the one or more named entities in the training text, and the at least one second knowledge identifier is in a one-to-one correspondence with the at least one named entity in the training text.

It should be understood that the fused first text vector includes at least one second knowledge identifier vector corresponding to the at least one second knowledge identifier, and the at least one second knowledge identifier vector is used to indicate a vector corresponding to the at least one named entity in the training text.

Optionally, the processing the fused first text vector and/or the fused first knowledge vector based on an original processing model, to obtain a second task result includes: processing, based on the original processing model, the vector that corresponds to the at least one named entity in the training text and that is indicated by the at least one second knowledge identifier vector, to obtain the second task result.

By setting, in the training text, the second knowledge identifier used to indicate the named entity, the original processing model can be guided to inject knowledge and semantic information into the second knowledge identifier, and the model can be guided to focus on the named entity indicated by the second identifier or extract a local knowledge feature.

With reference to the first aspect, in a possible implementation, the original fusion model is obtained through training based on the first knowledge data and preset pre-training text.

Optionally, the preset pre-training text is a large-scale text corpus.

With reference to the first aspect, in a possible implementation, the association between the third named entity and the fourth named entity is a relation between the third named entity and the fourth named entity; or the association between the third named entity and the fourth named entity is an attribute of the third named entity, and the fourth named entity is an attribute value of the attribute.

With reference to the first aspect, in a possible implementation, the original fusion model is any one of the following models: the multilayer self-attention model, the multilayer perceptron model, the recurrent neural network model, the weight model, the convolutional neural network model, the generative adversarial network model, and the reinforcement learning neural network model.

According to a second aspect, a model training method is provided, including: obtaining first knowledge data, where the first knowledge data includes a third named entity, a fourth named entity, and an association between the third named entity and the fourth named entity; processing the first knowledge data to obtain a first knowledge vector, where the first knowledge vector includes a vector corresponding to the third named entity, a vector corresponding to the fourth named entity, and a vector corresponding to the association between the third named entity and the fourth named entity; obtaining training text and a first task result that corresponds to the training text and a target task, where the training text includes one or more named entities, and the one or more named entities include the third named entity; processing the training text to obtain a first text vector; fusing the first text vector and the first knowledge vector based on an original fusion model, to obtain a fused first text vector and a fused first knowledge vector; processing the fused first text vector and/or the fused first knowledge vector based on an original processing model, to obtain a second task result; and adjusting parameters of the original processing model based on the first task result and the second task result, to obtain a target processing model.

In a target processing model training process, the parameters of the original processing model are adjusted based on the first knowledge data and the training text, to obtain the target processing model. Because the knowledge data is fused into the training text, a capability of understanding natural language by the target processing model is improved, and accuracy of a processing result of the target processing model is improved.

With reference to the second aspect, in a possible implementation, the method further includes: adjusting parameters of the original fusion model based on the first task result and the second task result, to obtain a target fusion model.

The target fusion model adapted to the target processing model can be obtained by adjusting the parameters of the original fusion model. In addition, the original fusion model can learn knowledge, so that the obtained target fusion model can include knowledge information.

With reference to the second aspect, in a possible implementation, the fused first text vector includes at least a part of information in the first knowledge data, and the fused first knowledge vector includes semantic background information of the training text.

After the first text vector and the first knowledge vector are fused, the first text vector is fused with knowledge information, and the first knowledge vector is fused with semantic background information. This helps the model understand a text language.

With reference to the second aspect, in a possible implementation, the training text further includes at least one second knowledge identifier, the at least one second knowledge identifier is used to indicate at least one named entity in the one or more named entities in the training text, and the at least one second knowledge identifier is in a one-to-one correspondence with the at least one named entity in the training text.

It should be understood that the fused first text vector includes at least one second knowledge identifier vector corresponding to the at least one second knowledge identifier, and the at least one second knowledge identifier vector is used to indicate a vector corresponding to the at least one named entity in the training text.

Optionally, the processing the fused first text vector and/or the fused first knowledge vector based on an original processing model, to obtain a second task result includes: processing, based on the original processing model, the vector that corresponds to the at least one named entity in the training text and that is indicated by the at least one second knowledge identifier vector, to obtain the second task result.

With reference to the second aspect, in a possible implementation, the original fusion model is obtained through training based on the first knowledge data and preset pre-training text.

With reference to the second aspect, in a possible implementation, the association between the third named entity and the fourth named entity is a relation between the third named entity and the fourth named entity; or the association between the third named entity and the fourth named entity is an attribute of the third named entity, and the fourth named entity is an attribute value of the attribute.

With reference to the second aspect, in a possible implementation, the original fusion model is any one of the following models: a multilayer self-attention model, a multilayer perceptron model, a recurrent neural network model, a weight model, a convolutional neural network model, a generative adversarial network model, and a reinforcement learning neural network model.

According to a third aspect, a text processing apparatus is provided, including: a memory, configured to store a program; and a processor, configured to execute the program stored in the memory. When the processor executes the program stored in the memory, the processor is configured to: obtain target knowledge data, where the target knowledge data includes a first named entity, a second named entity, and an association between the first named entity and the second named entity; process the target knowledge data to obtain a target knowledge vector, where the target knowledge vector includes a vector corresponding to the first named entity, a vector corresponding to the second named entity, and a vector corresponding to the association between the first named entity and the second named entity; process to-be-processed text to obtain a target text vector, where the to-be-processed text includes one or more named entities, and the one or more named entities include the first named entity; fuse the target text vector and the target knowledge vector based on a target fusion model, to obtain a fused target text vector and a fused target knowledge vector; and process the fused target text vector and/or the fused target knowledge vector based on a target processing model, to obtain a processing result corresponding to a target task.

According to the solution provided in this application, the target fusion model fuses the target text vector corresponding to the to-be-processed text and the target knowledge vector corresponding to the target knowledge data, and uses the obtained fused target text vector and/or the obtained fused target knowledge vector as input data for the target processing model. Because knowledge is fused into the to-be-processed text, the input data for the target processing model is more accurate. This can improve a capability of understanding the to-be-processed text by the target processing model, and improve accuracy of the processing result of the target task, that is, improve accuracy of a result of processing the target task by the text processing apparatus.

It should be understood that the fused target text vector is a to-be-processed text vector.

With reference to the third aspect, in a possible implementation, the to-be-processed text further includes at least one first knowledge identifier, the at least one first knowledge identifier is used to indicate at least one named entity in the one or more named entities in the to-be-processed text, and the at least one first knowledge identifier is in a one-to-one correspondence with the at least one named entity in the to-be-processed text.

It should be understood that the fused target text vector includes at least one first knowledge identifier vector corresponding to the at least one first knowledge identifier, and the at least one first knowledge identifier vector is used to indicate a vector corresponding to the at least one named entity in the to-be-processed text.

Optionally, the processor is specifically configured to process, based on the target processing model, the vector that corresponds to the at least one named entity in the to-be-processed text and that is indicated by the at least one first knowledge identifier vector, to obtain the processing result corresponding to the target task.

With reference to the third aspect, in a possible implementation, the fused target text vector includes at least a part of information in the target knowledge data, and the fused target knowledge vector includes semantic background information of the to-be-processed text.

With reference to the third aspect, in a possible implementation, the association between the first named entity and the second named entity is a relation between the first named entity and the second named entity; or the association between the first named entity and the second named entity is an attribute of the first named entity, and the second named entity is an attribute value of the attribute.

With reference to the third aspect, in a possible implementation, the target fusion model is any one of the following models: a multilayer self-attention model, a multilayer perceptron model, a recurrent neural network model, a weight model, a convolutional neural network model, a generative adversarial network model, and a reinforcement learning neural network model.

With reference to the third aspect, in a possible implementation, the processor is further configured to: obtain first knowledge data, where the first knowledge data includes a third named entity, a fourth named entity, and an association between the third named entity and the fourth named entity, and the target knowledge data includes the first knowledge data; process the first knowledge data to obtain a first knowledge vector, where the first knowledge vector includes a vector corresponding to the third named entity, a vector corresponding to the fourth named entity, and a vector corresponding to the association between the third named entity and the fourth named entity; obtain training text and a first task result that corresponds to the training text and the target task, where the training text includes one or more named entities, and the one or more named entities include the third named entity; process the training text to obtain a first text vector; fuse the first text vector and the first knowledge vector based on an original fusion model, to obtain a fused first text vector and a fused first knowledge vector; process the fused first text vector and/or the fused first knowledge vector based on an original processing model, to obtain a second task result; and adjust parameters of the original processing model based on the first task result and the second task result, to obtain the target processing model; and/or adjust parameters of the original fusion model based on the first task result and the second task result, to obtain the target fusion model.

With reference to the third aspect, in a possible implementation, the fused first text vector includes at least a part of information in the first knowledge data, and the fused first knowledge vector includes semantic background information of the training text.

With reference to the third aspect, in a possible implementation, the training text further includes at least one second knowledge identifier, the at least one second knowledge identifier is used to indicate at least one named entity in the one or more named entities in the training text, and the at least one second knowledge identifier is in a one-to-one correspondence with the at least one named entity in the training text.

It should be understood that the fused first text vector includes at least one second knowledge identifier vector corresponding to the at least one second knowledge identifier, and the at least one second knowledge identifier vector is used to indicate a vector corresponding to the at least one named entity in the training text.

Optionally, the processor is specifically configured to process, based on the original processing model, the vector that corresponds to the at least one named entity in the training text and that is indicated by the at least one second knowledge identifier vector, to obtain the second task result.

With reference to the third aspect, in a possible implementation, the original fusion model is obtained through training based on the first knowledge data and preset pre-training text.

With reference to the third aspect, in a possible implementation, the association between the third named entity and the fourth named entity is a relation between the third named entity and the fourth named entity; or the association between the third named entity and the fourth named entity is an attribute of the third named entity, and the fourth named entity is an attribute value of the attribute.

With reference to the third aspect, in a possible implementation, the original fusion model is any one of the following models: the multilayer self-attention model, the multilayer perceptron model, the recurrent neural network model, the weight model, the convolutional neural network model, the generative adversarial network model, and the reinforcement learning neural network model.

According to a fourth aspect, a model training apparatus is provided, including: a memory, configured to store a program; and a processor, configured to execute the program stored in the memory. When the processor executes the program stored in the memory, the processor is configured to: obtain first knowledge data, where the first knowledge data includes a third named entity, a fourth named entity, and an association between the third named entity and the fourth named entity; process the first knowledge data to obtain a first knowledge vector, where the first knowledge vector includes a vector corresponding to the third named entity, a vector corresponding to the fourth named entity, and a vector corresponding to the association between the third named entity and the fourth named entity; obtain training text and a first task result that corresponds to the training text and a target task, where the training text includes one or more named entities, and the one or more named entities include the third named entity; process the training text to obtain a first text vector; fuse the first text vector and the first knowledge vector based on an original fusion model, to obtain a fused first text vector and a fused first knowledge vector; process the fused first text vector and/or the fused first knowledge vector based on an original processing model, to obtain a second task result; and adjust parameters of the original processing model based on the first task result and the second task result, to obtain a target processing model.

In a target processing model training process, the parameters of the original processing model and/or the parameters of the original fusion model are adjusted based on the first knowledge data and the training text, to obtain the target processing model and/or the target fusion model. This improves a capability of understanding natural language by the target processing model and/or the target fusion model, and improves accuracy of the processing result of the target processing model.

With reference to the fourth aspect, in a possible implementation, the processor is further configured to adjust parameters of the original fusion model based on the first task result and the second task result, to obtain a target fusion model.

With reference to the fourth aspect, in a possible implementation, the fused first text vector includes at least a part of information in the first knowledge data, and the fused first knowledge vector includes semantic background information of the training text.

With reference to the fourth aspect, in a possible implementation, the training text further includes at least one second knowledge identifier, the at least one second knowledge identifier is used to indicate at least one named entity in the one or more named entities in the training text, and the at least one second knowledge identifier is in a one-to-one correspondence with the at least one named entity in the training text.

It should be understood that the fused first text vector includes at least one second knowledge identifier vector corresponding to the at least one second knowledge identifier, and the at least one second knowledge identifier vector is used to indicate a vector corresponding to the at least one named entity in the training text.

Optionally, the processor is specifically configured to process, based on the original processing model, the vector that corresponds to the at least one named entity in the training text and that is indicated by the at least one second knowledge identifier vector, to obtain the second task result.

With reference to the fourth aspect, in a possible implementation, the original fusion model is obtained through training based on the first knowledge data and preset pre-training text.

With reference to the fourth aspect, in a possible implementation, the association between the third named entity and the fourth named entity is a relation between the third named entity and the fourth named entity; or the association between the third named entity and the fourth named entity is an attribute of the third named entity, and the fourth named entity is an attribute value of the attribute.

With reference to the fourth aspect, in a possible implementation, the original fusion model is any one of the following models: a multilayer self-attention model, a multilayer perceptron model, a recurrent neural network model, a weight model, a convolutional neural network model, a generative adversarial network model, and a reinforcement learning neural network model.

According to a fifth aspect, a text processing apparatus is provided. The apparatus includes a module configured to perform the method according to the first aspect or any one of the possible implementations in the first aspect.

According to a sixth aspect, a model training apparatus is provided. The apparatus includes a module configured to perform the method according to the second aspect or any one of the possible implementations in the second aspect.

According to a seventh aspect, a computer program product is provided. The computer program product includes a computer program (which may also be referred to as code or instructions). When the computer program is run, a computer is enabled to perform the method according to any one of the possible implementations in the first aspect or the second aspect.

According to an eighth aspect, a computer-readable medium is provided. The computer-readable medium stores a computer program (which may also be referred to as code or instructions). When the computer program is run on a computer, the computer is enabled to perform the method according to any one of the possible implementations in the first aspect or the second aspect.

According to a ninth aspect, a chip system is provided. The chip system includes a memory and a processor. The memory is configured to store a computer program. The processor is configured to invoke the computer program from the memory and run the computer program, so that a communications device on which the chip system is installed performs the method according to any one of the possible implementations in the first aspect or the second aspect.

The chip system may include an input circuit or interface configured to send information or data, and an output circuit or interface configured to receive information or data.

According to a tenth aspect, an electronic device is provided, where the electronic device includes the text processing apparatus in the third aspect or the text processing apparatus in the fifth aspect.

DESCRIPTION OF EMBODIMENTS

The following describes the technical solutions of this application with reference to the accompanying drawings.

Figure 1:
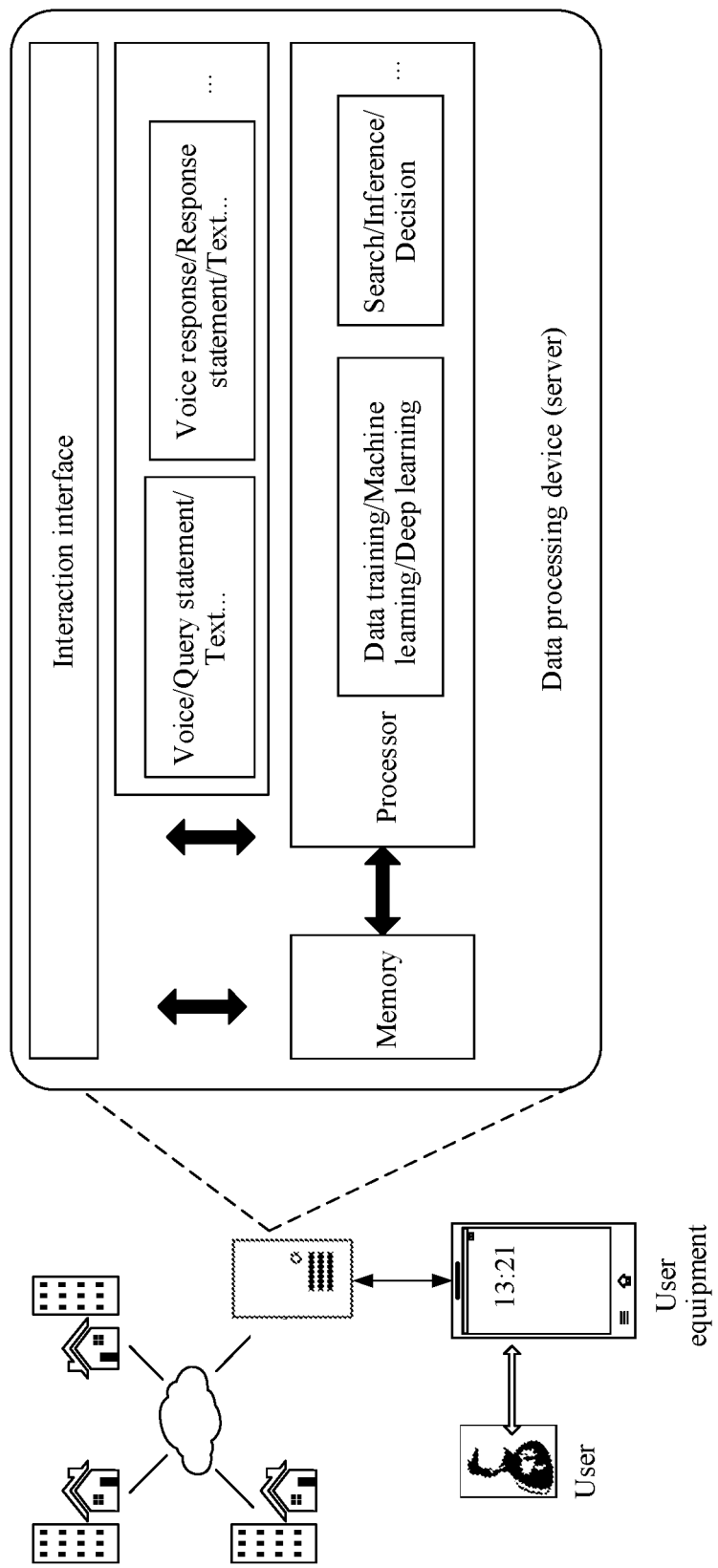
FIG. 1 is a schematic diagram of an application scenario of natural language processing according to an embodiment of this application.
Figure 2:
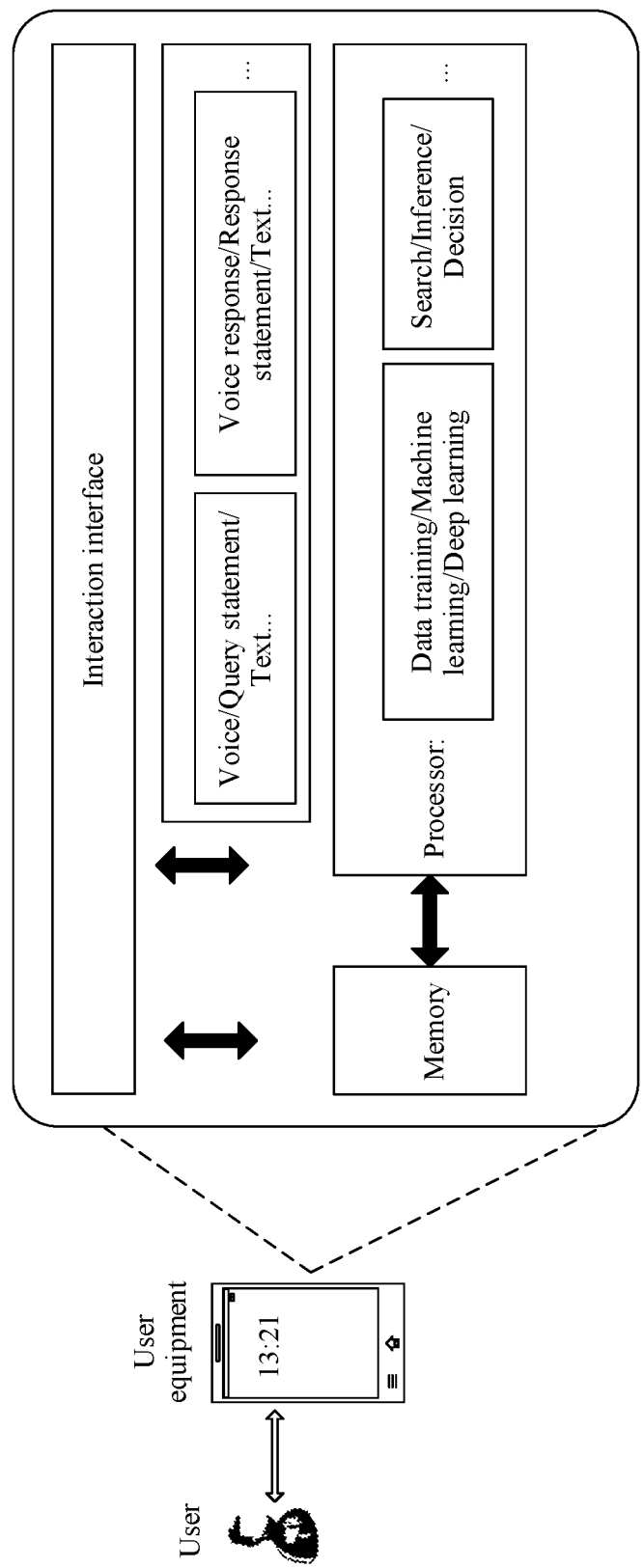
FIG. 2 is a schematic diagram of another application scenario of natural language processing according to an embodiment of this application.
Figure 3:
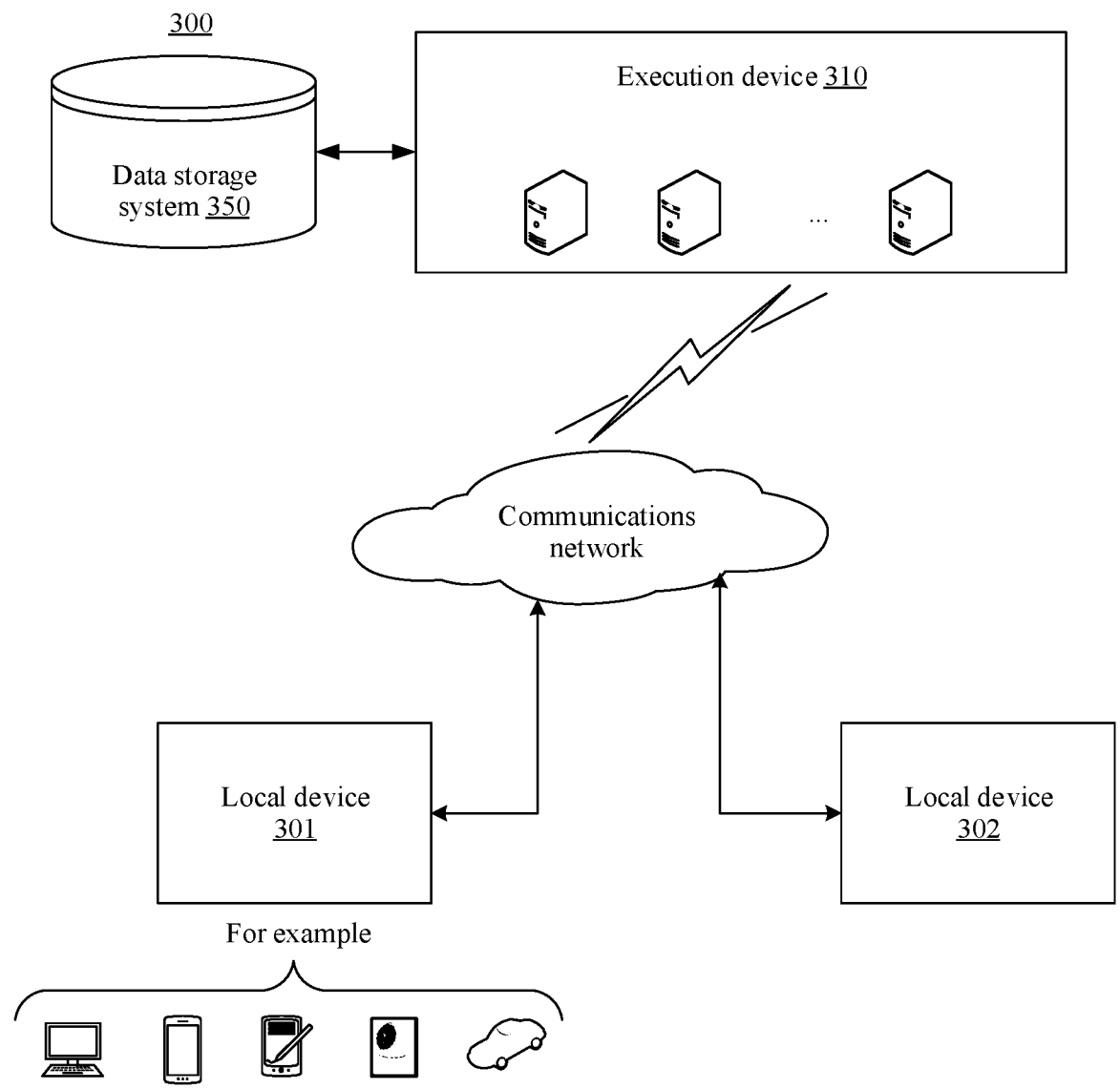
FIG. 3 is a schematic diagram of a device related to natural language processing according to an embodiment of this application.

To better understand the solutions in the embodiments of this application, the following briefly describes a possible application scenario in the embodiments of this application with reference to FIG. 1 to FIG. 3.

FIG. 1 shows a natural language processing system. The natural language processing system includes user equipment and a data processing device. The user equipment includes an intelligent terminal such as a mobile phone, a personal computer, or an information processing center. The user equipment is an initiating end of natural language data processing. As an initiator of a request for language questioning and answering, querying, or the like, a user usually initiates the request by using the user equipment.

The data processing device may be a device or a server having a data processing function, such as a cloud server, a network server, an application server, or a management server. The data processing device receives, through an interaction interface, a question such as a statement/voice/text query from the intelligent terminal, and then performs, by using a memory storing data and a processor processing data, language data processing in a manner of machine learning, deep learning, searching, inference, decision-making, or the like. The memory in the data processing device may be a general name, and includes a local storage and a database storing historical data. The database may be located on the data processing device, or may be located on another network server.

In the natural language processing system shown in FIG. 1, the user equipment may receive an instruction of the user. For example, the user equipment may receive a piece of text entered by the user, and then initiate a request to the data processing device, so that the data processing device executes a natural language processing application (for example, text classification, text inference, named entity recognition, or translation) on the piece of text obtained by the user equipment, to obtain a processing result (for example, a classification result, an inference result, a named entity recognition result, or a translation result) of a corresponding natural language processing application for the piece of text. For example, the user equipment may receive a piece of Chinese text entered by the user, and then initiate a request to the data processing device, so that the data processing device performs entity classification on the piece of Chinese text, to obtain an entity classification result for the piece of Chinese text. For example, the user equipment may receive a piece of Chinese text entered by the user, and then initiate a request to the data processing device, so that the data processing device translates the piece of Chinese text into English, to obtain an English translation for the piece of Chinese text.

In FIG. 1, the data processing device may perform a text processing method according to an embodiment of this application.

FIG. 2 shows another natural language processing system. In FIG. 2, user equipment is directly used as a data processing device. The user equipment can directly receive an input from a user, and the input is directly processed by using hardware of the user equipment. A specific process is similar to that in FIG. 1. For details, refer to the foregoing descriptions. Details are not described herein again.

In the natural language processing system shown in FIG. 2, the user equipment may receive an instruction of the user. For example, the user equipment may receive a piece of text entered by the user, and then the user equipment executes a natural language processing application (for example, text classification, text inference, named entity recognition, or translation) on the piece of text, to obtain a processing result (for example, a classification result, an inference result, a named entity recognition result, or a translation result) of the corresponding natural language processing application for the piece of text. For example, the user equipment may receive a piece of Chinese text entered by the user, and perform entity classification on the piece of Chinese text, to obtain an entity classification result for the piece of Chinese text. For example, the user equipment may receive a piece of Chinese text entered by the user, and translate the piece of Chinese text into English, to obtain an English translation for the piece of Chinese text.

In FIG. 2, the user equipment may perform a text processing method according to an embodiment of this application.

FIG. 3 is a schematic diagram of a device related to natural language processing according to an embodiment of this application.

The user equipment in FIG. 1 and FIG. 2 may be specifically a local device 301 or a local device 302 in FIG. 3, and the data processing device in FIG. 1 may be specifically an execution device 310 in FIG. 3. A data storage system 350 may store data to be processed by the execution device 310. The data storage system 350 may be integrated into the execution device 310, or may be disposed on a cloud or another network server.

The processor in FIG. 1 and FIG. 2 may perform data training/machine learning/deep learning by using a neural network model or another model (for example, a support vector machine-based model), and execute a natural language processing application (for example, text classification, sequence labeling, reading comprehension, text generation, text inference, translation) on a text sequence by using a model obtained through final data training or learning, to obtain a corresponding processing result.

Because the embodiments of this application relate to applications of a large quantity of neural networks, for ease of understanding, the following first describes related terms and related concepts such as neural network in the embodiments of this application.

(1) Neural Network

The neural network may include a neuron. The neuron may be an operation unit that uses $x_s$ and an intercept of 1 as input. Output of the operation unit may be as follows:

$$h_{W,b}(x)=f(W^T x)=f(\Sigma_{s=1}^{n} W_s x_s + b) \qquad (1\text{-}1)$$

Herein, s=1, 2, ..., n, n is a natural number greater than 1, $W_s$ represents a weight of $x_s$, b represents a bias of the neuron, and f represents an activation function (activation function) of the neuron, where the activation function is used to introduce a non-linear characteristic into the neural network, to convert an input signal in the neuron into an output signal. The output signal of the activation function may be used as input of a next convolutional layer, and the activation function may be a sigmoid function. The neural network is a network constituted by connecting a plurality of single neurons together. To be specific, output of a neuron may be input of another neuron. Input of each neuron may be connected to a local receptive field of a previous layer to extract a feature of the local receptive field. The local receptive field may be a region including several neurons.

(2) Deep Neural Network

The deep neural network (DNN) is also referred to as a multi-layer neural network, and may be understood as a neural network having a plurality of hidden layers. The DNN is divided based on positions of different layers. Neural networks inside the DNN may be classified into three types: an input layer, a hidden layer, and an output layer. Generally, the first layer is the input layer, the last layer is the output layer, and the middle layer is the hidden layer. Layers are fully connected. To be specific, any neuron in an $i^{th}$ layer is necessarily connected to any neuron in an $(i+1)^{th}$ layer.

Although the DNN seems complex, work of each layer is actually not complex, and is simply expressed by the following linear relational expression: $\vec{y}=\alpha(W\square\vec{x}+\vec{b})$. $\vec{x}$ represents an input vector, $\vec{y}$ represents an output vector, $\vec{b}$ represents a bias vector, W represents a weight matrix (which is also referred to as a coefficient), and $\alpha()$ represents an activation function. In each layer, only such a simple operation is performed on the input vector $\vec{x}$ to obtain the output vector $\vec{y}$. Due to a large quantity of DNN layers, quantities of coefficients W and bias vectors $\vec{b}$ are also large. These parameters are defined in the DNN as follows: Using the coefficient W as an example, it is assumed that in a three-layer DNN, a linear coefficient from a fourth neuron in a second layer to a second neuron in a third layer is defined as $W_{24}^3$. A superscript 3 represents a number of a layer in which the coefficient W is located, and a subscript corresponds to an index 2 of the third layer for output and an index 4 of the second layer for input.

In conclusion, a coefficient from a $k^{th}$ neuron in an $(L-1)^{th}$ layer to a $j^{th}$ neuron in an $L^{th}$ layer is defined as $W_{jk}^L$.

It should be noted that the input layer has no parameter W. In the deep neural network, more hidden layers make the network more capable of describing a complex case in the real world. Theoretically, a model with more parameters has higher complexity and a larger "capacity". It indicates that the model can complete a more complex learning task. Training of the deep neural network is a process of learning a weight matrix, and a final objective of the training is to obtain a weight matrix of all layers of a trained deep neural network (a weight matrix formed by vectors W of many layers).

(3) Convolutional Neural Network

The convolutional neural network (CNN) is a deep neural network with a convolutional structure. The convolutional neural network includes a feature extractor including a convolutional layer and a sub-sampling layer. The feature extractor may be considered as a filter. The convolutional layer is a neuron layer that performs convolution processing on an input signal that is in the convolutional neural network. In the convolutional layer of the convolutional neural network, one neuron may be connected to only a part of neurons in a neighboring layer. A convolutional layer generally includes several feature planes, and each feature plane may include some neurons arranged in a rectangle. Neurons of a same feature plane share a weight, and the shared weight herein is a convolution kernel. Sharing the weight may be understood as that a manner of extracting image information is unrelated to a position. The convolution kernel may be initialized in a form of a matrix of a random size. In a training process of the convolutional neural network, an appropriate weight may be obtained for the convolution kernel through learning. In addition, sharing the weight is advantageous because connections between layers of the convolutional neural network are reduced, and a risk of overfitting is reduced.

(4) A recurrent neural network (RNN) is used to process sequence data. In a conventional neural network model, from an input layer to a hidden layer and then to an output layer, the layers are fully connected, but nodes in each layer are not connected. This common neural network resolves many problems, but is still incompetent to resolve many other problems. For example, to predict a next word in a sentence, a previous word usually needs to be used, because adjacent words in the sentence are not independent. A reason why the RNN is referred to as a recurrent neural network is that current output of a sequence is related to previous output. A specific representation form is that the network memorizes previous information and applies the previous information to calculation of the current output. To be specific, nodes in the hidden layer are no longer unconnected, but are connected, and input for the hidden layer includes not only output of the input layer but also output of the hidden layer at a previous moment. Theoretically, the RNN can process sequence data of any length. Training of the RNN is the same as training of a conventional CNN or DNN.

A reason why the recurrent neural network is required when there is the convolutional neural network is simple. In the convolutional neural network, there is a premise that elements are independent of each other, and input and output are also independent, such as a cat and a dog. However, many elements are interconnected in the real world. For example, stocks change over time. For another example, a person says: I like traveling, a most favorite place is Yunnan, and I will go there in the future if there is a chance. If there is a blank to be filled herein, people should know that "Yunnan" is to be filled in. This is because people can make an inference from a context, but how can a machine do this? The RNN emerges. The RNN is designed to enable a machine to have a capability to remember like human beings. Therefore, output of the RNN depends on current input information and historical memory information.

(5) Attention Mechanism

The attention mechanism simulates an internal process of biological observation behavior, and is a mechanism that aligns internal experience with external feeling to increase observation precision of some regions. The mechanism can quickly select high-value information from a large amount of information by using limited attention resources. The attention mechanism is widely used in natural language processing tasks, especially machine translation, because the attention mechanism can quickly extract an important feature of sparse data. A self-attention mechanism is an improvement of the attention mechanism. The self-attention mechanism reduces dependence on external information and is better at capturing an internal correlation of data or features. An essential idea of the attention mechanism can be expressed by the following formula:

$$\text{Attention}(\text{Query},\text{Source})=\sum_{i=1}^{L_x}\text{Similarity}(\text{Query},\text{Key}_i)*\text{Value}_i \qquad (1\text{-}2)$$

$L_x=\|\text{Source}\|$ represents a length of a source. A meaning of the formula is that constituent elements in the source are considered to be constituted by a series of <Key, Value> data pairs. In this case, given an element Query in a target, a weight coefficient of a value corresponding to each key is obtained by calculating similarity or a correlation between Query and the key, and then weighted summation is performed on values to obtain a final attention value. Therefore, in essence, the attention mechanism is to perform weighted summation on values of the elements in the source, where Query and a key are used to calculate a weight coefficient of a corresponding value. Conceptually, the attention mechanism can be understood as a mechanism for selecting a small amount of important information from a large amount of information and focusing on the important information, but ignoring most unimportant information. A focus process is reflected in calculation of a weight coefficient. A larger weight indicates that a value corresponding to the weight is more focused. That is, the weight indicates importance of information, and the value indicates the information corresponding to the weight. The self-attention mechanism may be understood as an intra attention (intra attention) mechanism. The attention mechanism occurs between the element Query in the target and all elements in the source. The self-attention mechanism is an attention mechanism that occurs between elements in the source or between elements in the target, and may also be understood as an attention calculation mechanism in a special case of Target=Source. A specific calculation process of the self-attention mechanism is the same except that a calculation object changes.

(6) Generative Adversarial Network (GAN)

The generative adversarial network is actually a combination of two networks, which may be understood as that one network generates simulated data, and the other network determines whether the generated data is real or simulated. The network that generates the simulated data needs to be continuously optimized, so that the determining network cannot determine whether the generated data is real or simulated. The determining network also needs to be continuously optimized, so that the determining network more accurately determines whether the generated data is real or simulated. A relationship between the two networks is adversarial. Therefore, the two networks are called a generative adversarial network. The GAN includes two parts: a generation model (generator) and a discrimination model (discriminator). The generation model mainly generates samples with a same distribution from training data, and estimates a joint probability distribution of input x and a category label y. The discrimination model determines whether the input is real data or data generated by the generation model, that is, estimates a conditional probability distribution that a sample belongs to a specific category. The discrimination model uses a conventional supervised learning method. After the combination of the two networks, after a large quantity of times of iterative training, the generation model can simulate, as much as possible, samples that are difficultly distinguished from real samples, and the discrimination model has a capability of more accurately distinguishing between real data and unreal data. Finally, the whole GAN reaches the Nash equilibrium. In other words, in a result of distinguishing the data of the generation model by the discrimination model, a correct ratio and an error ratio each accounts for 50%.

(7) Back Propagation Algorithm

In a training process, a neural network may correct values of parameters in an initial neural network model by using an error back propagation (BP) algorithm, so that a reconstruction error loss of the neural network model becomes increasingly smaller. Specifically, an input signal is forward transferred until an error loss occurs in output, and the parameters in the initial neural network model are updated based on back propagation error loss information, so that the error loss is reduced. The back propagation algorithm is a back propagation motion mainly dependent on the error loss, and aims to obtain parameters of an optimal neural network model, for example, a weight matrix.

(8) Natural Language Processing (NLP)

A natural language is a human language, and natural language processing (NLP) is human language processing. Natural language processing (NLP) is a process of systematic analysis, understanding, and information extraction of text data in an intelligent and efficient manner. By using NLP and components of the NLP, a very large amount of text data can be managed or a lot of automated tasks can be performed, and various problems can be resolved, such as automatic summarization, machine translation (MT), named entity recognition (NER), relation extraction (RE), information extraction (IE), sentiment analysis, speech recognition, question answering, and topic segmentation.

For example, there may be the following types of natural language processing tasks.

Sequence labeling: A model needs to provide a classification category for each word in a sentence based on a context. For example, the sequence labeling is Chinese word segmentation, part-of-speech tagging, named entity recognition, or semantic role tagging.

Classification task: A classification value is output for the entire sentence. For example, the classification task is text classification.

Sentence relation inference: Two sentences are given, and whether the two sentences have a nominal relation is determined. For example, the sentence relation inference is entailment, QA, semantic rewriting, or natural language inference.

Generative task: One piece of text is output and another piece of text is generated. For example, the generative task is machine translation, text summarization, writing poems and sentences, describing a picture orally.

The following provides some natural language processing examples.

Word segmentation (WB): Continuous natural language text is segmented into lexical sequences with semantic rationality and integrity, to eliminate a cross ambiguity. Example sentence: zhi bi ye he shang wei bi ye de tong xue. Word segmentation 1: zhi biye he shangwei biye de tongxue. Word segmentation 2: zhi biye heshang wei biye de tongxue.

Named entity recognition (NER): Entities (person, place, institution, time, works, and the like) having specific meanings in natural language text are recognized, to integrate unknown words at a granularity. Example sentence: tian shi ai mei li zai xian guan kan. Word segmentation: tianshi ai meili zaixian guankan. Entity: Angel Amelie→Movie.

Part-of-speech tagging: A part-of-speech (noun, verb, adjective, or the like) is assigned to each word in natural language text. Dependency parsing (dependency parsing): Syntactic elements (subject, predicate, object, attributive, adverbial, complement, and the like) in a sentence are automatically analyzed, to eliminate a structural ambiguity. Comment: fang jian li hai ke yi xin shang ri chu. Ambiguity 1: fang jian hai ke yi. Ambiguity 2: ke yi xin shang ri chu. Part of speech: fang jian li (subject), hai ke yi (predicate), xin shang ri chu (verb-object phrase).

Word vector and semantic similarity (word embedding & semantic similarity): Words are represented in a vectorized manner, and semantic similarity calculation is performed on the words based on the vectorized representation, to resolve a problem of linguistic similarity between the words. For example, which one (dai gua/cao mei) does xi gua approximate? Vectorized representation: xi gua (0.1222, 0.22333, . . . ); similarity calculation: dai gua (0.115), and cao mei (0.325); vectorized representation: (−0.333, 0.1223 . . . ) (0.333, 0.3333, . . . ).

Text semantic similarity: Based on massive data in the entire network and a deep neural network technology, calculation of semantic similarity between pieces of text is implemented, to resolve a problem of text semantic similarity. For example, which one (gian pai zhao zen me zhuang/ru he ban li Beijing pai zhao) does che tou ru he fang zhi che pai approximate? Vectorized representation: che tou ru he fang zhi che pai (0.1222, 0.22333, . . . ); similarity calculation: qian pai zhao zen me zhuang (0.762) and ru he ban li Beijing pai zhao (0.486); vector representation: (−0.333, 0.1223 . . . ) (0.333, 0.3333, . . . ).

(9) Language Model (Language Model, LM)

The language model is a basic model in NPL. Through a large amount of corpus training and learning, the LM can infer a probability of an unknown word based on existing information (for example, text information such as a word that is present in a context). The LM may also be understood as a probability model used to calculate a probability of a sentence. In other words, the language model is a probability distribution of a natural language text sequence, and the probability distribution represents a possibility of existence of text with a specific sequence and a specific length. In short, the language model predicts a next word based on a context. Because there is no need to manually tag a corpus, the language model can learn rich semantic knowledge from an unlimited large-scale corpus.

(10) Large-Scale Pre-Trained Language Model (Large-Scale Pre-Trained Language Model)

The large-scale pre-trained language model may also be referred to as a large-scale language pre-trained model. Generally, by using a large-scale corpus (for example, language training materials such as sentences and paragraphs), a language model training task is designed, and a large-scale neural network algorithm structure is trained to learn; and a finally obtained large-scale neural network algorithm structure is the large-scale pre-trained language model. For another subsequent task, feature extraction or task fine-tuning may be performed based on the model to fulfill a specific task. An idea of pre-training is to first train a task to obtain a set of model parameters, then initialize network model parameters by using the set of model parameters, and then train another task by using an initialized network model, to obtain a model adapted to the another task. Through pre-training by using a large-scale corpus, a neural language representation model can learn a powerful language representation capability and can extract rich syntactic and semantic information from text. The large-scale pre-trained language model may provide a sentence-level feature and a token that includes rich semantic information used by a downstream task, or perform fine-tuning for a downstream task directly on the basis of the pre-trained model. In this way, a downstream dedicated model is obtained quickly and conveniently.

(11) Fine-Tuning

The fine-tuning is to perform small-scale training based on the pre-trained model by using a specific task objective (a downstream task) and task data (downstream data), to slightly adjust parameters of the pre-trained model, and finally obtain a model adapted to specific data and a specific task.

(12) Knowledge Graph

The knowledge graph describes various entities or concepts and relations between the entities or concepts in the real world, and forms a huge semantic network diagram, where a node represents an entity or a concept, and an edge is constituted by an attribute or a relation. An association between two entities is described by using a relation, for example, a relation between Beijing and China. For an attribute of an entity, an "attribute-value pair" is used to describe an intrinsic characteristic, for example, a person has attributes such as age, height, and weight. Currently, the knowledge graph has been widely used to refer to various large-scale knowledge bases.

Entity: The entity refers to an object that is distinguishable and exists independently, for example, a person, a city, a plant, or a commodity. Everything in the world is constituted by concrete objects, which refer to entities, for example, "China", "United States", and "Japan". The entity is a most basic element in the knowledge graph. There are different relations between different entities.

Semantic category (concept): The semantic category is a collection of entities with a same characteristic, such as a country, a nationality, a book, and a computer. The concept mainly refers to a collection, a category, an object type, a thing type, for example, people or geography.

Content: The content is usually used as names, descriptions, and interpretations of entities and semantic categories, and may be expressed by text, images, and audio/videos.

Attribute (value) (property): The attribute points to an attribute value of an entity from the entity. Different attribute types correspond to edges of different types of attributes. The attribute value refers to a value of an attribute specified by an object. For example, "area", "population", and "capital" are several different attributes of the entity "China". The attribute value mainly refers to the value of the attribute specified by the object. For example, a value of the area attribute specified by "China" is "9.6 million square kilometers".

Relation: The relation is formalized as a function that maps kk points to a Boolean value. In the knowledge graph, the relation is a function that maps kk graph nodes (entities, semantic categories, attribute values) to a Boolean value.

Based on the foregoing definition, to facilitate processing and understanding by a computer, knowledge may be represented in a more formalized and concise manner, that is, by using a triple. A triple-based manner is a general representation manner of the knowledge graph. Basic forms of the triple mainly include (entity 1-relation-entity 2), (entity-attribute-attribute value), and the like. Each entity (an extension of a concept) may be identified by using a globally uniquely determined ID, each attribute-attribute-value pair (AVP) may be used to describe an intrinsic characteristic of the entity, and a relation may be used to connect two entities and describe an association between the two entities. For example, China is an entity, Beijing is an entity, and (China-capital-Beijing) is a triple example of (entity-relation-entity); and Beijing is an entity, area is an attribute, 20,693,000 is an attribute value, and (Beijing-population-20,693,000) is a triple example of (entity-attribute-attribute value). A difference between an attribute and a relation lies in that, two entities corresponding to a triple in which the attribute is located are mostly one entity and one character string, but two entities corresponding to a triple in which the relation is located are mostly two entities. In the embodiments of this application, for ease of understanding and description, an attribute value in a triple in which the attribute is located is also considered as an entity, and the attribute is considered as an association between the two entities. In other words, in the embodiments of this application, knowledge represented based on a triple is used to indicate an association between two entities. The association between the two entities may be a relation between the two entities (for example, (entity 1-relation-entity 2)); or the association between the two entities may be an attribute of one of the entities, and the other entity is an attribute value of the attribute (for example, (entity-attribute-attribute value)). In the embodiments of this application, the knowledge represented based on a triple may also be referred to as structured knowledge. It should be further understood that representation forms of the triple are not limited to the foregoing forms of (entity 1-relation-entity 2) and (entity-attribute-attribute value). For example, the representation forms may further include (entity 1-entity 2-relation) and (entity-attribute value-attribute). In some embodiments, the attribute may also be considered as a relation in a broad sense.

The text processing method in this application may be used to perform a natural language processing task on a natural language text sequence. For different natural language processing tasks (that is, target tasks in this application), target processing models used to process the natural language text sequence are different. The method provided in this application is described in the following from a target processing model training side and a target processing model application side.

A target processing model training method provided in the embodiments of this application relates to natural language text processing, and may be specifically applied to data processing methods such as data training, machine learning, and deep learning, to perform symbolic and formalized intelligence information modeling, extraction, preprocessing, training, and the like on training data (for example, training text and first knowledge data in this application), to finally obtain a trained target processing model. In addition, according to the text processing method provided in the embodiments of this application, input data (for example, to-be-processed text in this application) may be input into the trained target processing model by using the foregoing trained target processing model, to obtain output data (for example, a processing result corresponding to a target task in this application). It should be noted that the target processing model training method and the text processing method that are provided in the embodiments of this application are generated based on a same concept, and may also be understood as two parts of a system, or two phases of an entire process, for example, a model training phase and a model application phase.

For ease of understanding and description, in the embodiments of this application, an example in which a target processing model is a CNN model (or referred to as a CNN network) is used for description. However, it should be understood that a type of the target processing model in the embodiments of this application is not limited thereto. Alternatively, the target processing model may be any one of models described above and models not shown.

Figure 4:
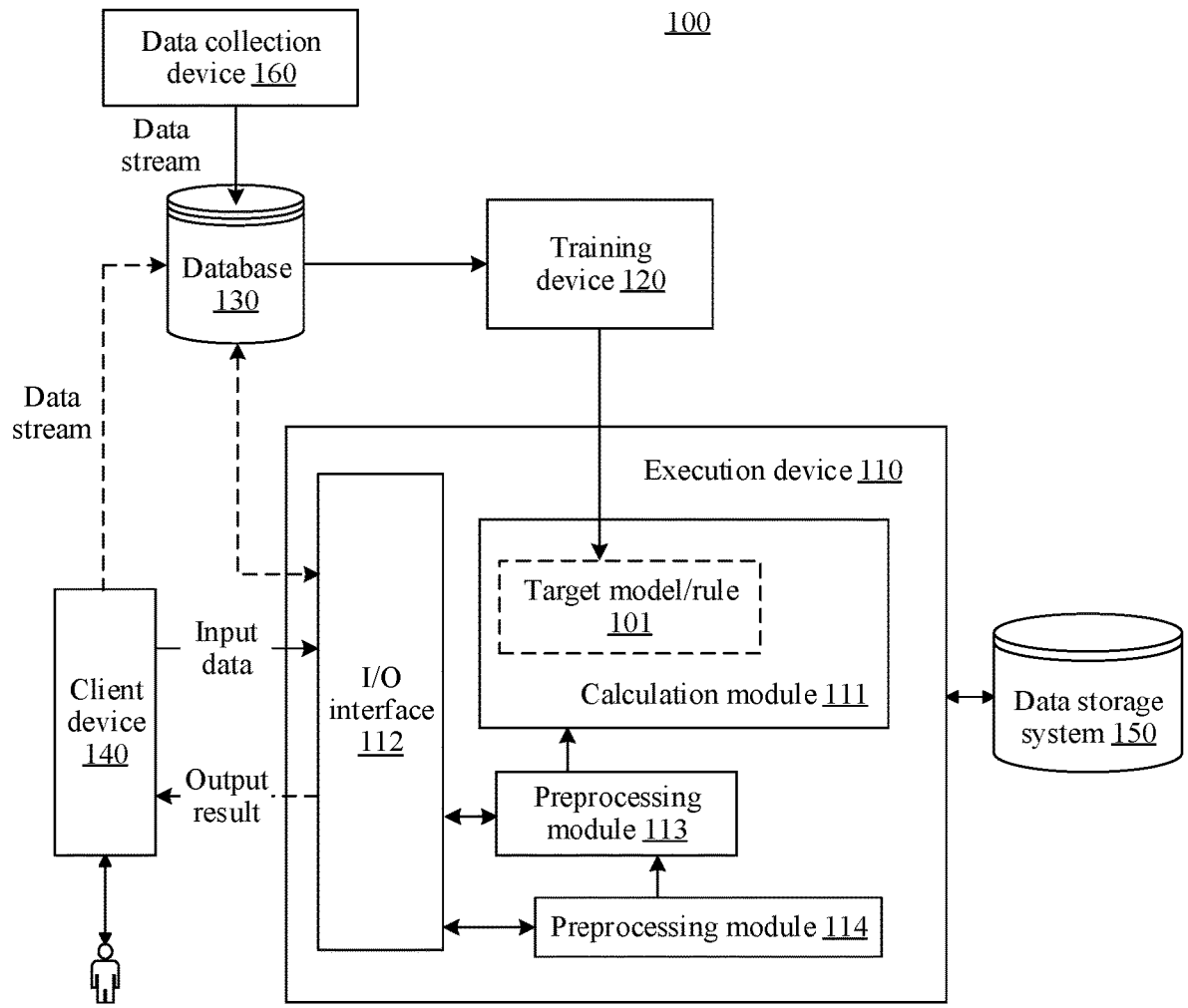
FIG. 4 is a schematic diagram of a system architecture according to an embodiment of this application.

First, a system architecture of the target processing model training method and the text processing method that are provided in the embodiments of this application is described. Refer to FIG. 4. An embodiment of this application provides a system architecture 100. As shown in the system architecture 100 in FIG. 4, a data collection device 160 is configured to collect training data. In this embodiment of this application, the training data includes training text and first knowledge data, and the first knowledge data includes knowledge information related to the training text. For example, the first knowledge data includes knowledge such as an attribute of each entity, or a relation between each entity in at least a part of entities in the training text and another entity.

After collecting the training data, the data collection device 160 stores the training data in a database 130. A training device 120 obtains a target model/rule 101 (that is, a target processing model in this embodiment of this application) by performing training based on the training data maintained in the database 130. The training device 120 processes the input training text and the input first knowledge data, and compares an output second task result with a first task result corresponding to the training text and a target task, until a difference between the second task result output by the training device 120 and the first task result meets a preset condition (for example, the difference between the second task result and the first task result is less than a specific threshold, or the difference between the second task result and the first task result remains unchanged or no longer decreases), so as to complete training of the target model/rule 101. How the training device 120 obtains the target model/rule 101 based on the training data is described in more detail in the following with reference to FIG. 8. It should be understood that, in this embodiment of this application, the second task result is a result output after the training device 120 processes the training data, and the first task result is a known correct result. The difference between the second task result and the first task result may be understood as a difference between the result output by the training device 120 and the correct result.

In addition, the target model/rule 101 can be used to implement the text processing method provided in the embodiments of this application. To be specific, after related preprocessing is performed on to-be-processed text and target knowledge data (processing may be performed by using a preprocessing module 113 and/or a preprocessing module 114), to-be-processed text and target knowledge data that are obtained through the related preprocessing are input into the target model/rule 101 for processing, to obtain a processing result corresponding to the target task performed by the target processing model. For example, if the target task is entity classification, the target processing model is a classification model. After related preprocessing is performed on the to-be-processed text and the target knowledge data, to-be-processed text and target knowledge data that are obtained through the related preprocessing are input into the target model/rule 101 (that is, the target processing model in this application) for processing, to obtain an entity classification result of the to-be-processed text.

In this embodiment provided in this application, the target model/rule 101 is obtained by training an original processing model. It should be noted that, in actual application, the training data maintained in the database 130 may not all be collected by the data collection device 160, or may be received and obtained from another device. It should be further noted that the training device 120 may not necessarily train the target model/rule 101 completely based on the training data maintained in the database 130, or may obtain training data from a cloud or another place to perform model training. The foregoing description should not be construed as a limitation on the embodiments of this application. It should be further noted that at least a part of data (for example, the first knowledge data) in the training data maintained in the database 130 may also be used to perform a process in which a device 110 processes the to-be-processed text.

The target model/rule 101 obtained through training by the training device 120 may be applied to different systems or devices, for example, an execution device 110 shown in FIG. 4. The execution device 110 may be a terminal, for example, a mobile phone terminal, a tablet, a laptop computer, an augmented reality (AR)/virtual reality (VR) terminal, or a vehicle-mounted terminal, or may be a server, a cloud, or the like.

In FIG. 4, an input/output (I/O) interface 112 is configured for the execution device 110, to exchange data with an external device. A user may input data into the I/O interface 112 by using a client device 140. In this embodiment of this application, the input data may include the to-be-processed text. Optionally, in this embodiment of this application, the input data may further include second knowledge data, and the second knowledge data includes knowledge information related to the to-be-processed text. For example, the second knowledge data includes knowledge such as an attribute of each entity, or a relation between each entity in at least a part of entities in the to-be-processed text and another entity.

The preprocessing module 113 and/or the preprocessing module 114 are/is configured to perform preprocessing based on the input data (for example, the to-be-processed text and the second knowledge data) received by the I/O interface 112 (specifically, the to-be-processed text and the second knowledge data may be processed to obtain a word vector). In this embodiment of this application, there may be no preprocessing module 113 and no preprocessing module 114 (or there may be only one of the preprocessing modules), and the input data is processed directly by using a calculation module 111. It should be noted that the preprocessing module 113 or the preprocessing module 114 may preprocess all the input data, or may preprocess a part of the input data. For example, if the input data includes the to-be-processed text and the second knowledge data, the preprocessing module 114 may process the to-be-processed text, and input a processing result into the preprocessing module 113. The preprocessing module may process the second knowledge data and the to-be-processed text that is processed by the preprocessing module 114, and input a processing result into the calculation module 111. For another example, if the input data includes the to-be-processed text and the second knowledge data, the to-be-processed text and the second knowledge data may be processed by using the preprocessing module 113 or the preprocessing module 114. It should be noted that the preprocessing module 113 and/or the preprocessing module 114 may alternatively be trained in the training device 120.

The calculation module 111 is configured to perform, based on the target model/rule 101, related processing such as calculation on the input data from the preprocessing module 113 or the I/O interface 112.

In a process in which the execution device 110 performs preprocessing on the input data or the calculation module 111 of the execution device 110 performs related processing such as calculation, the execution device 110 may invoke data, code, and the like in a data storage system 150 for corresponding processing, and may also store data, instructions, and the like obtained through corresponding processing into the data storage system 150.

Finally, the I/O interface 112 feeds back a processing result (for example, a classification result, a translation result, or an inference result) to the client device 140. It should be understood that different natural language processing tasks correspond to different target models/rules 101, and corresponding processing results of the target models/rules 101 are also different.

It should be noted that the training device 120 may generate, for different downstream systems, target models/rules 101 corresponding to the downstream systems, and the corresponding target models/rules 101 may be used to implement the foregoing objectives or complete the foregoing tasks, to provide required results for the user. It should be noted that the training device 120 may further generate corresponding preprocessing models for the target models/rules 101 corresponding to the different downstream systems, for example, corresponding preprocessing models in the preprocessing module 113 and/or the preprocessing module 114.

In a case shown in FIG. 4, the user may manually provide input data (for example, input a piece of text) by operating an interface provided by the I/O interface 112. In another case, the client device 140 may automatically send input data (for example, input a piece of text) to the I/O interface 112. If the client device 140 needs to be authorized by the user to automatically send the input data, the user may set corresponding permission on the client device 140. The user may view, on the client device 140, a result output by the execution device 110. Specifically, the result may be specifically presented in a form such as display, sound, or action (for example, the output result may be whether the translation is acceptable). The client device 140 may also serve as a data collection end to collect, as new sample data, input data that is input into the I/O interface 112 and an output result that is output from the I/O interface 112 that are shown in the figure, and store the new sample data into the database 130. Certainly, the client device 140 may alternatively not perform collection, but the I/O interface 112 directly stores, as new sample data into the database 130, input data that is input into the I/O interface 112 and an output result that is output from the I/O interface 112 that are shown in the figure.

It should be noted that FIG. 4 is merely a schematic diagram of the system architecture according to this embodiment of this application. A location relationship between devices, components, modules, and the like shown in the figure does not constitute any limitation. For example, in FIG. 4, the data storage system 150 is an external memory relative to the execution device 110. In another case, the data storage system 150 may alternatively be disposed in the execution device 110.

As shown in FIG. 4, the target model/rule 101 is obtained through training by the training device 120. The target model/rule 101 may be the target processing model in the embodiments of this application. Specifically, the target processing model provided in the embodiments of this application is a neural network, for example, may be a CNN, a deep convolutional neural network (DCNN), or a recurrent neural network (RNN).

Because the CNN is a very common neural network, a structure of the CNN is described below in detail with reference to FIG. 5. As described in the foregoing description of basic concepts, the convolutional neural network is a deep neural network with a convolutional structure, and is a deep learning architecture. The deep learning architecture is to perform multi-level learning at different abstract levels by using a machine learning algorithm. As a deep learning architecture, the CNN is a feed-forward artificial neural network, and each neuron in the feed-forward artificial neural network can respond to an image input into the feed-forward artificial neural network.

Figure 5:
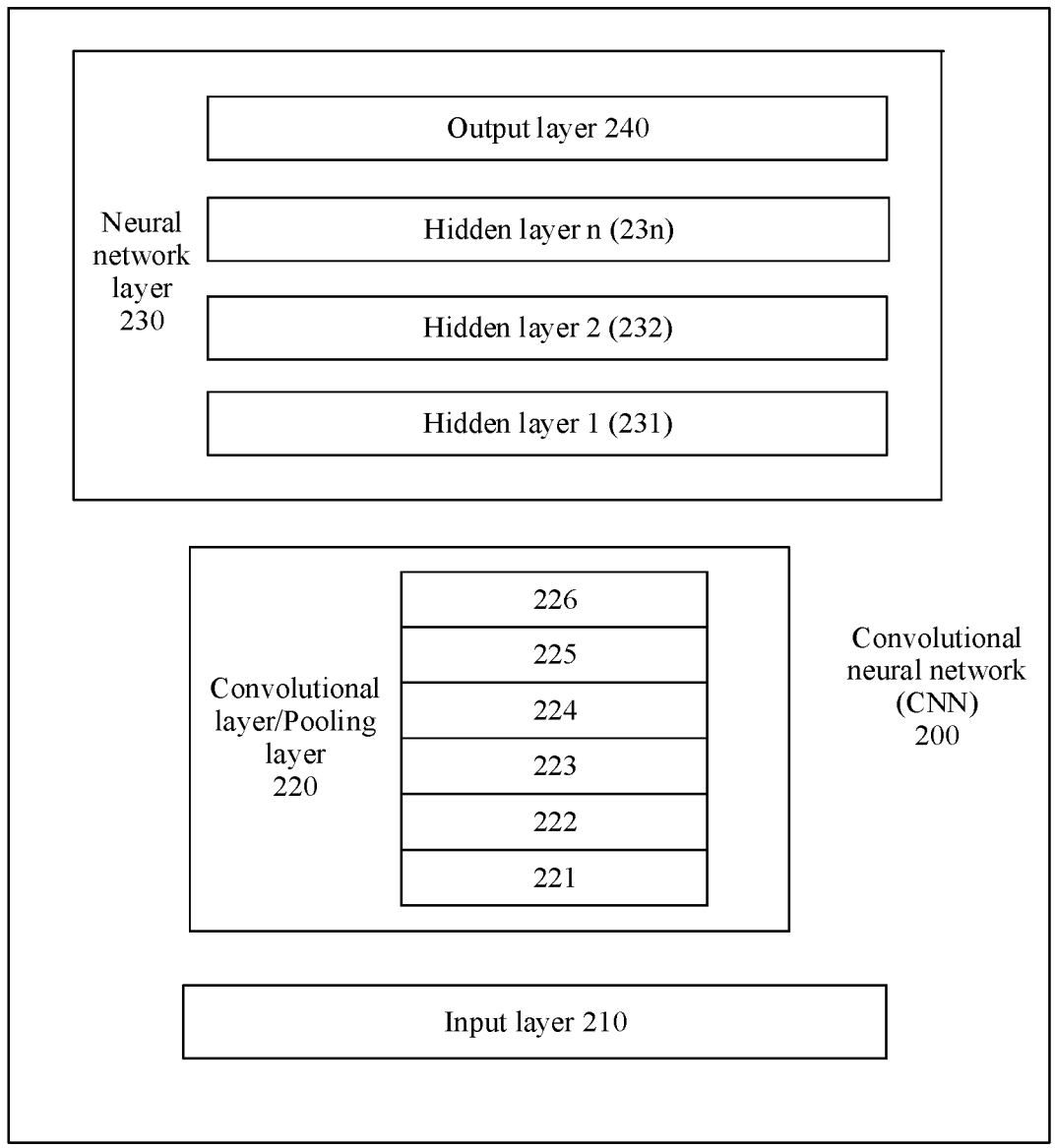
FIG. 5 is a schematic diagram of performing text processing based on a CNN model according to an embodiment of this application.

As shown in FIG. 5, a convolutional neural network (CNN) 200 may include an input layer 210, a convolutional layer/pooling layer 220 (the pooling layer is optional), and a neural network layer 230. The following describes related content of these layers in detail.

Convolutional Layer/Pooling Layer 220:

Convolutional Layer:

As shown in FIG. 5, the convolutional layer/pooling layer 220 may include, for example, layers 221 to 226. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer; and in another implementation, the layers 221 and 222 are convolutional layers, the 223 layer is a pooling layer, the layers 224 and 225 are convolutional layers, and the layer 226 is a pooling layer. In other words, output of a convolutional layer may be used as input for a subsequent pooling layer, or may be used as input for another convolutional layer, to continue to perform a convolution operation.

The following describes internal working principles of the convolutional layer by using the convolutional layer 221 as an example.

The convolutional layer 221 may include a plurality of convolution operators. The convolution operator is also referred to as a kernel. In natural language processing, the convolution operator functions as a filter that extracts specific information from input voice or semantic information. The convolution operator may be a weight matrix essentially, and the weight matrix is usually predefined.

In actual application, a lot of training needs to be performed to obtain weight values in these weight matrices. The weight matrices constituted by the weight values obtained through training may be used to extract information from input data, to help the convolutional neural network 200 to perform correct prediction.

When the convolutional neural network 200 has a plurality of convolutional layers, an initial convolutional layer (for example, the layer 221) usually extracts more general features, where the general features may also be referred to as low-level features. As a depth of the convolutional neural network 200 increases, a deeper convolutional layer (for example, the layer 226) extracts more complex features, such as high-level semantic features. Higher-level semantic features are more applicable to a problem to be resolved.

Pooling Layer:

A quantity of training parameters usually needs to be reduced. Therefore, a pooling layer usually needs to be periodically introduced after a convolutional layer. For the layers 221 to 226 illustrated in 220 in FIG. 5, one convolutional layer may be followed by one pooling layer, or a plurality of convolutional layers may be followed by one or more pooling layers. During natural language data processing, the pooling layer is only used to reduce a space size of data.

Neural Network Layer 230:

After processing is performed by the convolutional layer/pooling layer 220, the convolutional neural network 200 still cannot output required output information, because the convolutional layer/pooling layer 220 only extracts a feature and reduces parameters obtained from input data, as described above. However, to generate final output information (required category information or other related information), the convolutional neural network 200 needs to use the neural network layer 230 to generate output of one required category or output of a quantity of a group of required categories. Therefore, the neural network layer 230 may include a plurality of hidden layers (231, 232, ..., and 23n shown in FIG. 5) and an output layer 240. Parameters included in the plurality of hidden layers may be obtained through pre-training based on related training data of a specific task type. For example, the task type may include speech or semantic recognition, classification, or generation.

The output layer 240 follows the plurality of hidden layers in the neural network layer 230, that is, the output layer 240 is the last layer of the entire convolutional neural network 200. The output layer 240 has a loss function similar to classification cross entropy, where the loss function is specifically used to calculate a prediction error. Once forward propagation of the entire convolutional neural network 200 (as shown in FIG. 5, propagation from 210 to 240 is forward propagation) is completed, weight values and deviations of the layers mentioned above start to be updated in back propagation (as shown in FIG. 5, propagation from 240 to 210 is back propagation), to reduce a loss of the convolutional neural network 200 and an error between a result output by the convolutional neural network 200 by using the output layer and a desired result.

It should be noted that the convolutional neural network 200 shown in FIG. 5 is merely an example of a convolutional neural network, and in specific application, the convolutional neural network may alternatively exist in a form of another network model.

Figure 6:
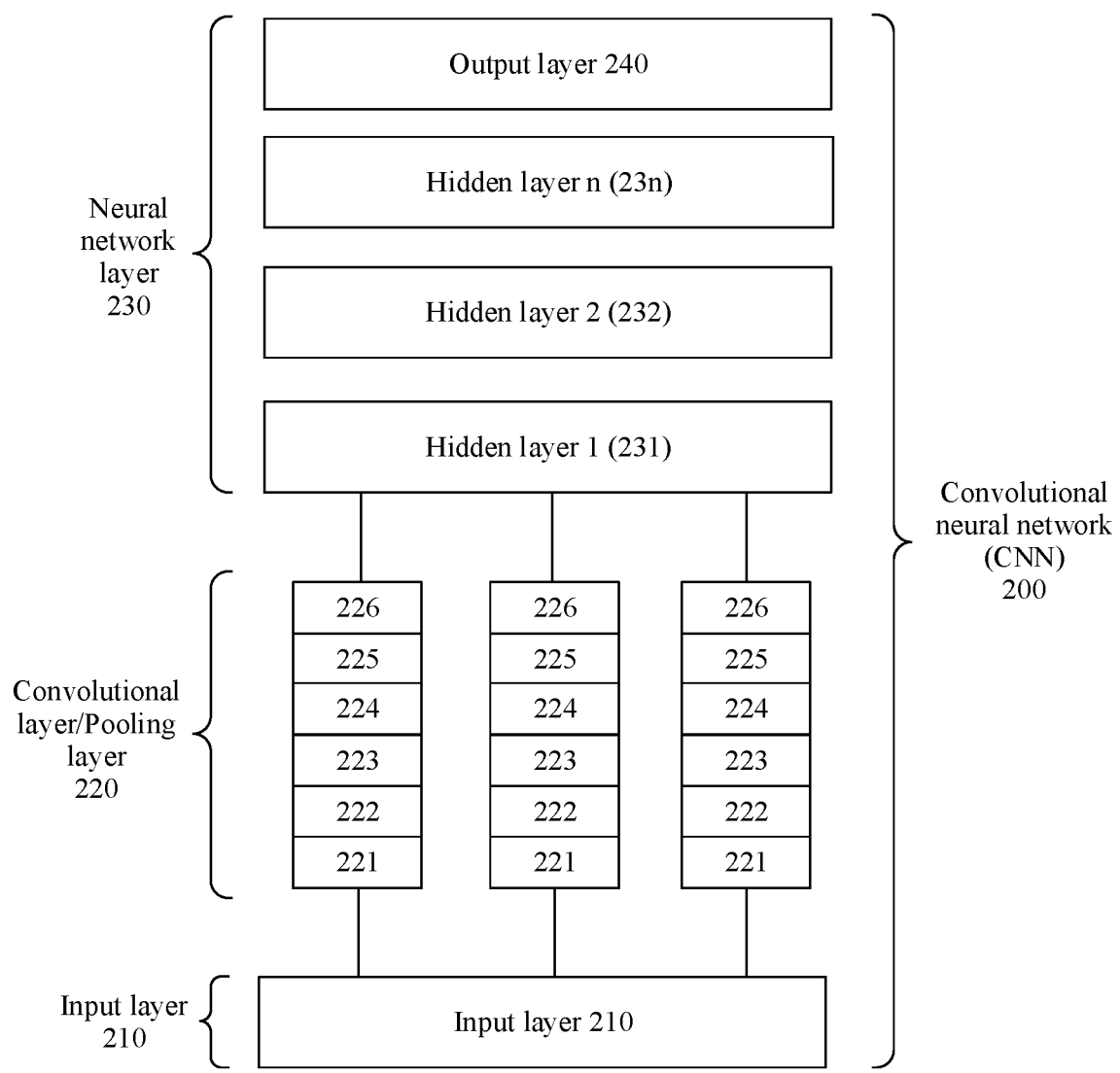
FIG. 6 is another schematic diagram of performing text processing based on a CNN model according to an embodiment of this application.

As shown in FIG. 6, a convolutional neural network (CNN) 200 may include an input layer 210, a convolutional layer/pooling layer 220 (the pooling layer is optional), and a neural network layer 230. In FIG. 6, at the convolutional layer/pooling layer 220, a plurality of convolutional layers/pooling layers are in parallel, and extracted features are all input into the neural network layer 230 for processing.

Figure 7:
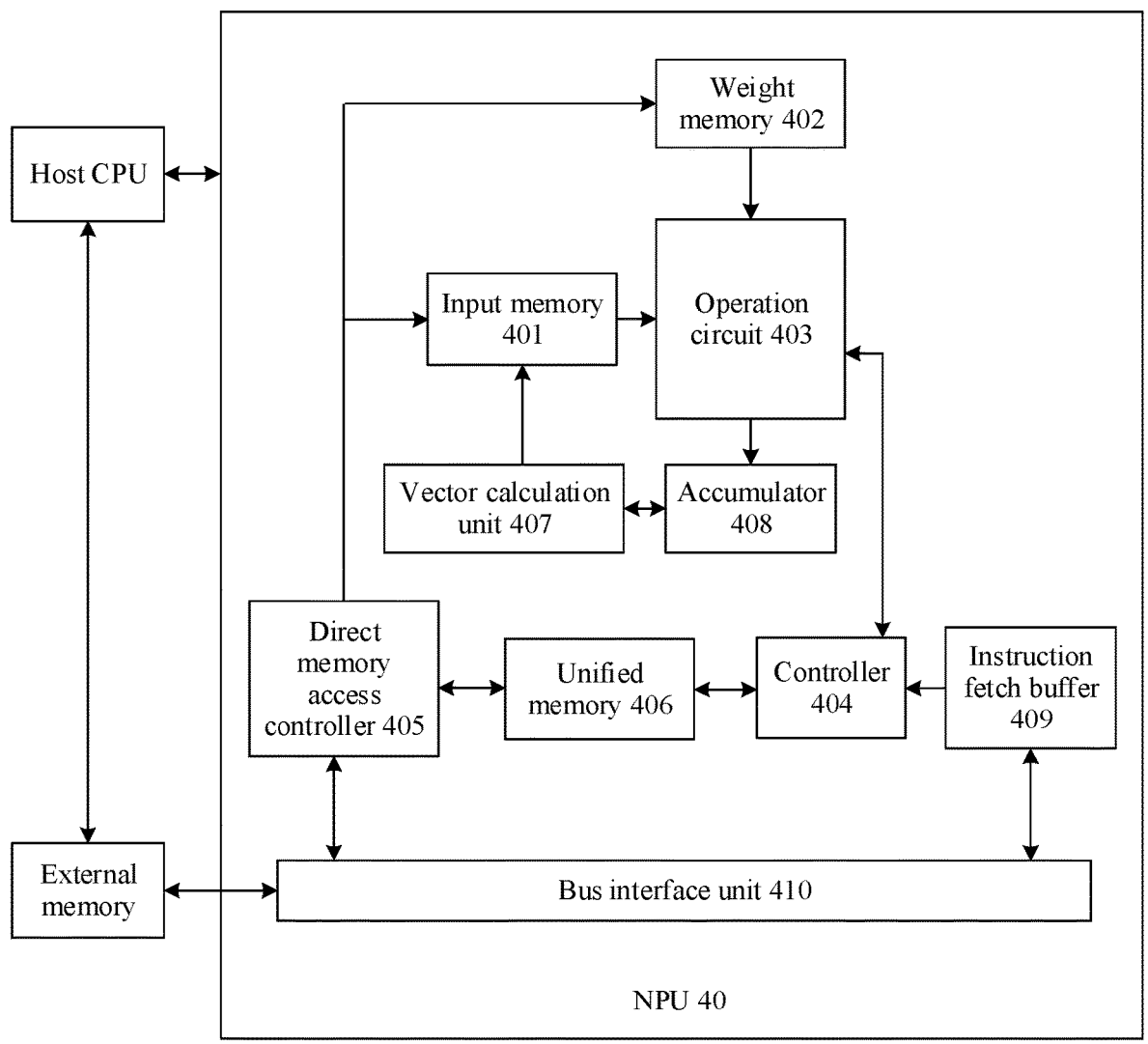
FIG. 7 is a schematic diagram of a hardware structure of a chip according to an embodiment of this application.

FIG. 7 is a schematic diagram of a hardware structure of a chip according to an embodiment of this application. The chip includes a neural network processing unit (NPU) 40. The chip may be disposed in the execution device 110 shown in FIG. 4, and is configured to complete calculation work of the calculation module 111. The chip may alternatively be disposed in the training device 120 shown in FIG. 4, and is configured to complete training work of the training device 120 and output the target module/rule 101. Algorithms at all layers of the convolutional neural network shown in FIG. 5 and FIG. 6 may be implemented on the chip shown in FIG. 7.

The text processing method in the embodiments of this application may be specifically performed by an operation circuit 403 and/or a vector calculation unit 407 in the NPU 40, to obtain a processing result of a target task.

The following briefly describes modules and units in the NPU 40.

The NPU 40 is mounted to a host CPU as a coprocessor, and the host CPU allocates a task to the NPU 40. A core part of the NPU 40 is the operation circuit 403. When the NPU 40 works, a controller 404 in the NPU 40 may control the operation circuit 403 to extract data from a memory (a weight memory or an input memory) and perform an operation.

In some implementations, the operation circuit 403 includes a plurality of processing engines (PEs). In some implementations, the operation circuit 403 is a two-dimensional systolic array. The operation circuit 403 may alternatively be a one-dimensional systolic array or another electronic circuit that can perform mathematical operations such as multiplication and addition. In some implementations, the operation circuit 403 is a general-purpose matrix processor.

For example, it is assumed that there are an input matrix A, a weight matrix B, and an output matrix C. The operation circuit fetches data corresponding to the matrix B from a weight memory 402 and buffers the data on each PE in the operation circuit. The operation circuit fetches data of the matrix A from an input memory 401, to perform a matrix operation with the matrix B to obtain a partial result or a final result of a matrix, and stores the result into an accumulator (accumulator) 408.

The vector calculation unit 407 may perform further processing on output of the operation circuit, such as vector multiplication, vector addition, exponential operation, logarithm operation, and size comparison. For example, the vector calculation unit 407 may be configured to perform network calculation, such as pooling, batch normalization, or local response normalization, at a non-convolutional/non-fully connected layer (FC) in a neural network.

In some implementations, the vector calculation unit 407 can store a processed output vector into a unified buffer 406. For example, the vector calculation unit 407 may apply a non-linear function to the output of the operation circuit 403, for example, to a vector of an accumulated value, so as to generate an activation value. In some implementations, the vector calculation unit 407 generates a normalized value, a combined value, or both. In some implementations, the processed output vector can be used as activation input for the operation circuit 403, for example, the processed output vector is used in a subsequent layer in the neural network.

The unified memory 406 is configured to store input data and output data.

For weight data, a direct memory access controller (DMAC) 405 moves input data in an external memory to the input memory 401 and/or the unified memory 406, stores weight data in the external memory into the weight memory 402, and stores data in the unified memory 406 into the external memory.

A bus interface unit (BIU) 410 is configured to implement interaction between the host CPU, the DMAC, and an instruction fetch buffer 409 through a bus.

The instruction fetch buffer 409 connected to the controller 404 is configured to store instructions used by the controller 404.

The controller 404 is configured to invoke the instructions buffered in the instruction fetch buffer 409, to control a working process of the operation accelerator.

Generally, the unified memory 406, the input memory 401, the weight memory 402, and the instruction fetch buffer 409 may all be on-chip memories. The external memory of the NPU may be a memory outside the NPU, and the external memory may be a double data rate synchronous dynamic random access memory (DDR SDRAM), a high bandwidth memory (HBM), or another readable and writable memory. It should be understood that a chip hardware result shown in FIG. 7 is merely an example for description, and this application is not limited thereto.

The following describes in detail a target processing model training method in the embodiments of this application with reference to the accompanying drawings. The target processing model training method in the embodiments of this application may be executed by a training device. The execution device may be specifically the data processing device in FIG. 1, the user equipment in FIG. 2, or the training device 120 in FIG. 4.

Figure 8:
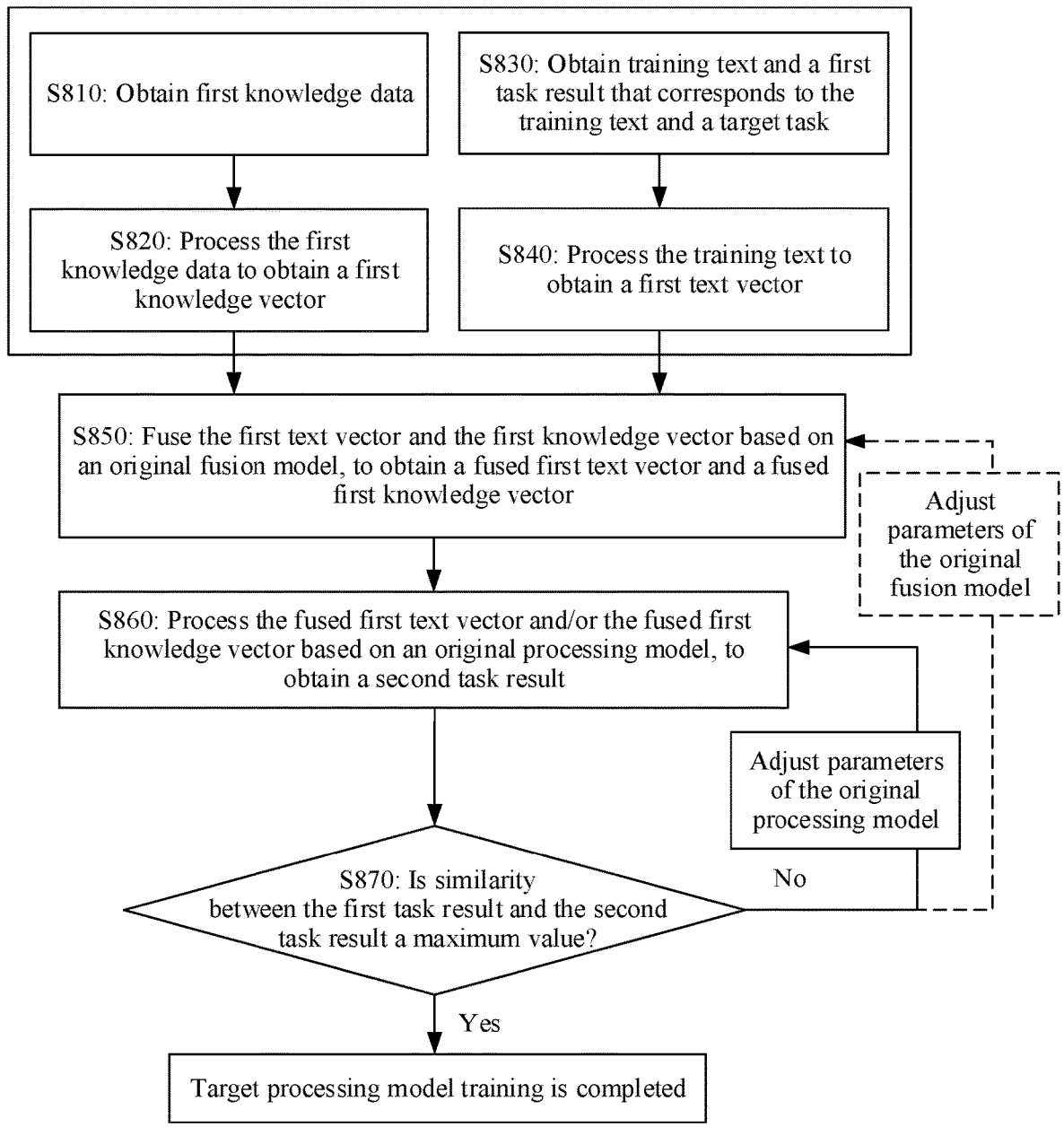
FIG. 8 is a schematic flowchart of a model training method according to an embodiment of this application.

FIG. 8 shows a training method 800 for a target processing model for text processing according to this application. The method may include step S810 to step S870.

It should be noted that a target processing model corresponds to a target task, and different target tasks correspond to different target processing models. For example, if the target task is named entity classification, the target processing model is a classification model; or if the target task is translation, the target processing model is a translation model. Examples are not enumerated herein. It should be further noted that, in this embodiment of this application, the target task may be referred to as a downstream task, and the target processing model may be referred to as a task model of the downstream task.

As shown in FIG. 8, in step S810, first knowledge data is obtained.

The first knowledge data includes a third named entity, a fourth named entity, and an association between the third named entity and the fourth named entity, where the third named entity is included in training text in step S830. It should be understood that, in this embodiment of this application, that the first knowledge data includes a third named entity, a fourth named entity, and an association between the third named entity and the fourth named entity is merely an example. The training text may include a plurality of third named entities. In this case, the first knowledge data includes the plurality of third named entities, a plurality of fourth named entities, and associations between the plurality of third named entities and the plurality of fourth named entities, where the plurality of third named entities are in a one-to-one correspondence with the plurality of fourth named entities. For example, the first knowledge data may include a plurality of triples, and each triple includes one third named entity, one fourth named entity, and an association between the third named entity and the fourth named entity. In other words, the first knowledge data may include knowledge information related to an entity in the training text, and the related knowledge described herein may be directly related or indirectly related knowledge. For example, if the training text includes an entity "China", the first knowledge data includes knowledge about "China", where the knowledge about "China" is based on a triple representation form. The knowledge about "China" may be (China-Capital-Beijing), (China-Area-9.6 million square kilometers), or (National-Political center-Capital).

Optionally, the association between the third named entity and the fourth named entity is a relation between the third named entity and the fourth named entity; or the association between the third named entity and the fourth named entity is an attribute of the third named entity, and the fourth named entity is an attribute value of the attribute. In other words, the association between the third named entity and the fourth named entity may be represented based on a triple as (third named entity-relation-fourth named entity), or (third named entity-attribute-attribute value (that is, fourth named entity)).

Optionally, the third named entity, the fourth named entity, and the association between the third named entity and the fourth named entity correspond to the target task. In other words, knowledge including the third named entity, the fourth named entity, and the association between the third named entity and the fourth named entity corresponds to the target task.

The first knowledge data may be structured knowledge, for example, a structured knowledge base (such as an encyclopedia) or other knowledge information. The first knowledge data may include knowledge related to the training text and/or the target task. For example, the first knowledge data includes a plurality of triples, and the plurality of triples are used to indicate the associations between the plurality of third named entities and the plurality of fourth named entities. In this embodiment of this application, "the third named entity, the fourth named entity, and the association between the third named entity and the fourth named entity" correspond to a piece of structured knowledge. In this embodiment of this application, that "the third named entity, the fourth named entity, and the association between the third named entity and the fourth named entity correspond to the target task" may be understood as that the structured knowledge corresponds to the target task. For example, if the training text includes the entity "China", the first knowledge data may include attribute-related knowledge such as the geographical location, the area, and the population of China, and may further include relation-related knowledge, for example, Beijing is the capital of China, and both China and the United States are countries. "China" may be understood as the third named entity in this embodiment of this application, and "9.6 million square kilometers", "Beijing", "the United States", or the like may be understood as the fourth named entity in this embodiment of this application. The geographical location, area, population of China, the relation that Beijing is the capital of China, and the concept that China and the United States are countries are all knowledge related to the training text and/or the target task.

It should be understood that the first knowledge data may further include knowledge related to the training text but not necessarily related to the target task. Data that is in the first knowledge data and that is related to different training texts and target tasks may be different. For example, for a target task #A and training text #A, the first knowledge data may further include knowledge that is unrelated to the training text #A and/or the target task #A. However, for training text #B and a target task #B, the knowledge that is in the first knowledge data and that is unrelated to the training text #A and/or the target task #A may be related to the training text #B and/or the target task #B.

Alternatively, the first knowledge data may be a text entity concept, for example, a named entity such as an apple, a mobile phone, China, or the United States. Although the text entity concept is not structured knowledge, the text entity concept can also provide knowledge information. In this embodiment of this application, the text entity concept is also the first knowledge data.

The first knowledge data may be obtained at the same time. For example, the first knowledge data is obtained before the training text is obtained. Alternatively, the first knowledge data may be obtained at different times. For example, a part of data in the first knowledge data may be obtained before the training text is obtained, and another part of data in the first knowledge data may be obtained at the same time when the training text is obtained or after the training text is obtained. This is not specifically limited in this embodiment of this application. Optionally, the part of knowledge data that is in the first knowledge data and that is obtained before the training text is obtained may be unrelated or weakly related to the training text, and the another part of data that is in the first knowledge data and that is obtained at the same time when the training text is obtained or after the training text is obtained may be related to the training text. It should be understood that, in this embodiment of this application, that the knowledge data is unrelated or weakly related to the training text may be understood as that the knowledge data does not include knowledge such as an attribute of an entity in the training text or a relation between the entity and another entity; and that the knowledge data is related to the training text may be understood as that the knowledge data includes knowledge such as an attribute of an entity in the training text or a relation between the entity and another entity.

In step S820, the first knowledge data is processed to obtain a first knowledge vector.

In this step, vectorization processing is performed on the first knowledge data represented by text, to obtain first knowledge data represented by a vector, that is, the first knowledge vector.

The first knowledge vector includes a vector corresponding to the third named entity, a vector corresponding to the fourth named entity, and a vector corresponding to the association between the third named entity and the fourth named entity. In other words, the first knowledge data may include knowledge information corresponding to the third named entity, knowledge information corresponding to the fourth named entity, and knowledge information corresponding to the association between the third named entity and the fourth named entity. When vectorization processing is performed, the knowledge information is converted into vectors correspondingly, that is, the vector corresponding to the third named entity, the vector corresponding to the fourth named entity, and the vector corresponding to the association between the third named entity and the fourth named entity. It should be understood that, the third named entity, the fourth named entity, and the association between the third named entity and the fourth named entity are merely an example, and knowledge information expressed by the first knowledge data and knowledge information expressed by the first knowledge vector are the same, but representation forms are different.

Optionally, if the first knowledge data includes structured knowledge, the first knowledge data may be encoded by using an existing knowledge encoding method (for example, translating embedding, TransE), and obtained encoded information is the first knowledge vector. Encoding the first knowledge data may be understood as converting the first knowledge data into a vector, for example, encoding the structured knowledge is converting the structured knowledge into a vector.

Optionally, if the first knowledge data includes a text entity concept, the first knowledge data may be encoded by using a text encoding method, and obtained encoded information is the first knowledge vector.

Optionally, if the first knowledge data includes structured knowledge, the structured knowledge may be converted into text and then the text is encoded by using the text encoding method, and obtained encoded information is the first knowledge vector.

Optionally, the first knowledge vector may be n-dimensional. n may be predefined, or determined based on a format of input data of an original fusion model.

In step S830, the training text and a first task result that corresponds to the training text and the target task are obtained.

In this embodiment of this application, the training text corresponds to the target task. For example, if the target task is to translate Chinese into English, the training text may be a piece of Chinese text. For another example, if the target task is entity classification, the training text may include a plurality of entities that need to be classified.

The training text may be any text sequence that conforms to a language grammar rule, for example, news, an encyclopedia, a social media message, or a literary work. This is not specifically limited in this embodiment of this application.

Optionally, the training text may be preprocessed text. For example, if the target task is a sequence probability prediction task, the training text may be text in which some characters, words, or entities are randomly replaced with an identifier [mask].

The first task result corresponds to the training text and the target task. It may be understood that the first task result is a known correct result corresponding to the training text and the target task, or is referred to as a reference result. For example, if the target task is the sequence probability prediction task, the first task result is the character, word, or entity replaced with the identifier [mask]. It should be understood that the first task result is known to a machine.

In step S840, the training text is processed to obtain a first text vector.

In this embodiment of this application, the training text may be encoded by using a neural network model (for example, a recurrent neural network model, or a self-attention transformer model) used for text encoding, and obtained encoded text information is the first text vector. Encoding the training text may be understood as converting the training text into a vector. Optionally, the neural network model used for text encoding may be a pre-trained text encoding model. It should be understood that information expressed by the training text and information expressed by the first text vector are the same, but representation forms are different.

Optionally, after the training text is processed, the obtained first text vector may include a text vector corresponding to an entire sequence in the training text or a text vector corresponding to each text unit in a sequence in the training text. It should be understood that a text unit in this embodiment of this application may be a character, a word, or a sentence.

Optionally, the first text vector may be m-dimensional. m may be predefined, or determined based on a requirement of the input data of the original fusion model.

It should be noted that, in step S810 to step S840, obtaining the first knowledge data in step S810 and obtaining the training text and the first task result that corresponds to the training text and the target task in step S830 may be separately or simultaneously performed. When step S810 and step S830 are separately performed, the two steps are not subject to a specific sequence in this embodiment of this application. In addition, obtaining the first knowledge data in step S810 and obtaining the first knowledge vector in step S820 may be simultaneously or separately performed. For example, step S820 may be performed after the first knowledge data is obtained; or the first knowledge data may be stored in a storage medium or a database after the first knowledge data is obtained, and when the first knowledge data needs to be used, the first knowledge data is read from the storage medium or the database.

In step S850, the first text vector and the first knowledge vector are fused based on the original fusion model, to obtain a fused first text vector and a fused first knowledge vector.

It should be understood that the fused first text vector and/or the fused first knowledge vector are/is data that is input into a target processing model and is used to train the target processing model.

The fused first text vector includes at least a part of information in the first knowledge data, and the fused first knowledge vector includes semantic background information (which may also be referred to as semantic environment information or context information) of the training text. In other words, the first text vector and the first knowledge vector are fused based on the original fusion model to obtain the fused first text vector and the fused first knowledge vector. The fused first text vector includes information about the training text corresponding to the first text vector and at least a part of knowledge information in the first knowledge data corresponding to the first knowledge vector, and the at least a part of knowledge information in the first knowledge data is related to the training text (for example, the fused first text vector includes knowledge such as attributes of the plurality of entities in the training text or a relation between an entity and another entity). The fused first knowledge vector includes the first knowledge data corresponding to the first knowledge vector and the semantic environment information of the training text corresponding to the first text vector (because an entity may have a plurality of meanings, meanings of the entity may be different in different semantic backgrounds, and the fused first knowledge vector may include context information of the entity in the training text).

The first text vector and the first knowledge vector may be fused based on the original fusion model in a plurality of manners.

For example, the original fusion model may fuse the first text vector and the first knowledge vector in an average manner.

For another example, the original fusion model may directly concatenate the first text vector and the first knowledge vector. To be specific, the fused first text vector includes information about the training text and information about the first knowledge data, and the fused first knowledge vector includes the information about the first knowledge data and the information about the training text. In other words, information content represented by the fused first text vector and information content represented by the fused first knowledge vector are the same.

For another example, the original fusion model may be a weight model. When the first text vector and the first knowledge vector are fused based on the original fusion model, a weight or a weight matrix may be assigned to the first text vector and a second text vector.

For another example, the original fusion model may alternatively be a model constituted by a complex multilayer network structure, for example, the original fusion model may be a multilayer self-attention model, a multilayer perceptron model, a recurrent neural network model, a convolutional neural network model, a generative adversarial network model, or a reinforcement learning neural network model. When the first text vector and the first knowledge vector are fused based on the original fusion model, a fusion process is correspondingly performed based on parameters of the original fusion model.

Optionally, the original fusion model may be obtained through training based on the first knowledge data and preset pre-training text. In other words, the original fusion model may be a pre-trained fusion model, that is, the parameters of the original fusion model are not randomly initialized, but are initialized by using a set of pre-trained parameters. Optionally, a pre-training process of the original fusion model may be a large-scale language pre-training process. For example, during pre-training of the original fusion model, training text for pre-training may be a large-scale corpus (or referred to as a large-scale pre-training text language). A training task for pre-training may be another task different from the target task. In the pre-training process, parameters of a task model of the pre-training task and parameters of the fusion model may be simultaneously adjusted, to finally obtain a trained original fusion model. The trained original fusion model may be used in training phases of a plurality of target processing models, that is, the trained original fusion model may be used to train task models of different target tasks.

In the pre-training process of the original fusion model, pre-training data includes the first knowledge data and the pre-training text. The original fusion model can learn rich semantic information by using a text corpus, and can also learn knowledge by using the first knowledge data, so that the original fusion model can include knowledge. This improves a capability of understanding a natural language by the model.

Optionally, the original fusion model may be a fusion model corresponding to the target task. In other words, in the pre-training process of the original fusion model, if the training task for pre-training is the same as the target task, the trained original fusion model obtained in the pre-training process is the fusion model corresponding to the target task.

In step S860, the fused first text vector and/or the fused first knowledge vector are/is processed based on an original processing model, to obtain a second task result.

The original processing model is a model that corresponds to the target task and that has not been trained, and parameters of the original processing model may be randomly initialized.

The second task result in this embodiment of this application is a processing result obtained by the original processing model based on the target task. For example, when the target task is prediction, the second task result is a prediction result; or when the target task is entity classification, the second task result is a classification result. The second task result is an output result of the original processing model.

Optionally, the fused first text vector may be processed based on the original processing model, to obtain the second task result. Alternatively, the fused first knowledge vector may be processed based on the original processing model, to obtain the second task result, for example, the fused first knowledge vector may include the information about the training text. Alternatively, the fused first text vector and the fused first knowledge vector may be processed based on the original processing model, to obtain the second task result. A specific implementation may be predefined, or may be determined based on an actual situation. This is not specifically limited in this embodiment of this application.

In step S870, it is determined whether similarity between the first task result and the second task result is a maximum value.

In this step, the similarity between the first task result and the second task result may be determined. Greater similarity between the first task result and the second task result may be understood as that the second task result approximates the first task result, that is, accuracy of the second task result is higher. If a determining result is yes, to be specific, the similarity between the first task result and the second task result is a maximum value, the original processing model that enables the similarity between the first task result and the second task result to be a maximum value is determined as the target processing model. In this case, a training process of the target processing model is completed. If a determining result is no, the parameters of the original processing model may be adjusted based on the similarity between the first task result and the second task result, and the foregoing steps S860 and S870 are repeated based on an original processing model obtained through parameter adjustment. For example, if the original processing model is a CNN model, parameters of the CNN model are adjusted after step S870.

Optionally, if the determining result is no, the parameters of the original fusion model and the parameters of the original processing model may be adjusted based on the similarity between the first task result and the second task result (as shown by a dashed line box in FIG. 8), and the foregoing steps S850 to S870 are repeated based on an original fusion model and an original processing model that are obtained through parameter adjustment. For example, if the original fusion model is a weight model, a weight matrix or a weight coefficient of the weight model may be adjusted after step S870; or if the original fusion model is a neural network model, parameters or the like of the neural network model may be adjusted after step S870.

In this case, the original fusion model obtained through parameter adjustment may be referred to as a target fusion model. The target fusion model is a fusion model adapted to the target processing model, or the target fusion model may be understood as a dedicated fusion model of the target processing model.

Optionally, in step S820 and step S840, the first knowledge data may be processed by using a neural network model #A to obtain the first knowledge vector, and the training text may be processed by using a neural network model #B to obtain the first text vector. Correspondingly, if the determining result is no in step S870, when the parameters of the original fusion model and/or the parameters of the original processing model are adjusted, parameters of the neural network model #A and/or parameters of the neural network model #B may also be adjusted based on the similarity between the first task result and the second task result, and the foregoing steps S820 to S870 are repeated based on each model obtained through parameter adjustment.

Optionally, the training text includes one or more named entities, and the one or more named entities include the third named entity. The training text may further include at least one second knowledge identifier, and the second knowledge identifier is used to indicate at least one named entity in the one or more named entities in the training text. The at least one second knowledge identifier is in a one-to-one correspondence with the at least one named entity in the one or more named entities in the training text. It should be understood that, in this embodiment of this application, a second knowledge identifier used to indicate one named entity is understood as one second knowledge identifier. However, one second knowledge identifier may include two parts in a form. For example, the second knowledge identifier may be located on two sides of the entity to specify a range indicated by the entity. Correspondingly, in step S840, that the training text is processed includes: The at least one second knowledge identifier is processed. After step S840, the obtained first text vector includes a vector corresponding to the at least one second knowledge identifier. Correspondingly, in step S850, the obtained fused first text vector includes at least one second knowledge identifier vector corresponding to the at least one second knowledge identifier, and the at least one second knowledge identifier vector is used to indicate a vector corresponding to the at least one named entity in the one or more named entities in the training text. Correspondingly, in step S860, that the fused first text vector is processed based on an original processing model includes: The vector that corresponds to the at least one named entity and that is indicated by the at least one second knowledge identifier vector is processed based on the original processing model, to obtain the second task result. A second knowledge identifier vector guides the original processing model to focus on an entity indicated by a second knowledge identifier, so as to extract knowledge information (for example, a local knowledge feature), so that the original processing model can complete the target task by using a special identifier. This can improve model training efficiency. For example, if a second knowledge identifier exists on two sides of each of the plurality of entities in the training text, when the original processing model processes the fused first text vector, the original processing model focuses on a vector corresponding to the second knowledge identifier, and extracts, based on the vector corresponding to the second knowledge identifier, an entity indicated by the second knowledge identifier, so as to process the entity.

In the model training method provided in this embodiment of this application, the target processing model is obtained through training based on the first knowledge data and the training text. Specifically, the original fusion model fuses a text vector corresponding to the training text and a knowledge vector corresponding to the first knowledge data, which is equivalent to fusing the training text and the first knowledge data. This enables the training text to be fused with knowledge information, so that semantics of the training text is richer. When the training text fused with knowledge is input into the original processing model, a capability of the original processing model for understanding the fused training text that is used as input data is improved, that is, a capability of understanding a language by the model is improved. This can improve accuracy of a processing result obtained when the original processing model performs the target task, and improve accuracy of a result of processing the target task by the target processing model obtained after training of the original processing model is completed. In addition, in a process of fusing the first knowledge data and the vector corresponding to the training text, the original fusion model can continuously learn knowledge, and a target fusion model obtained after training is completed can include knowledge information.

Figure 9:
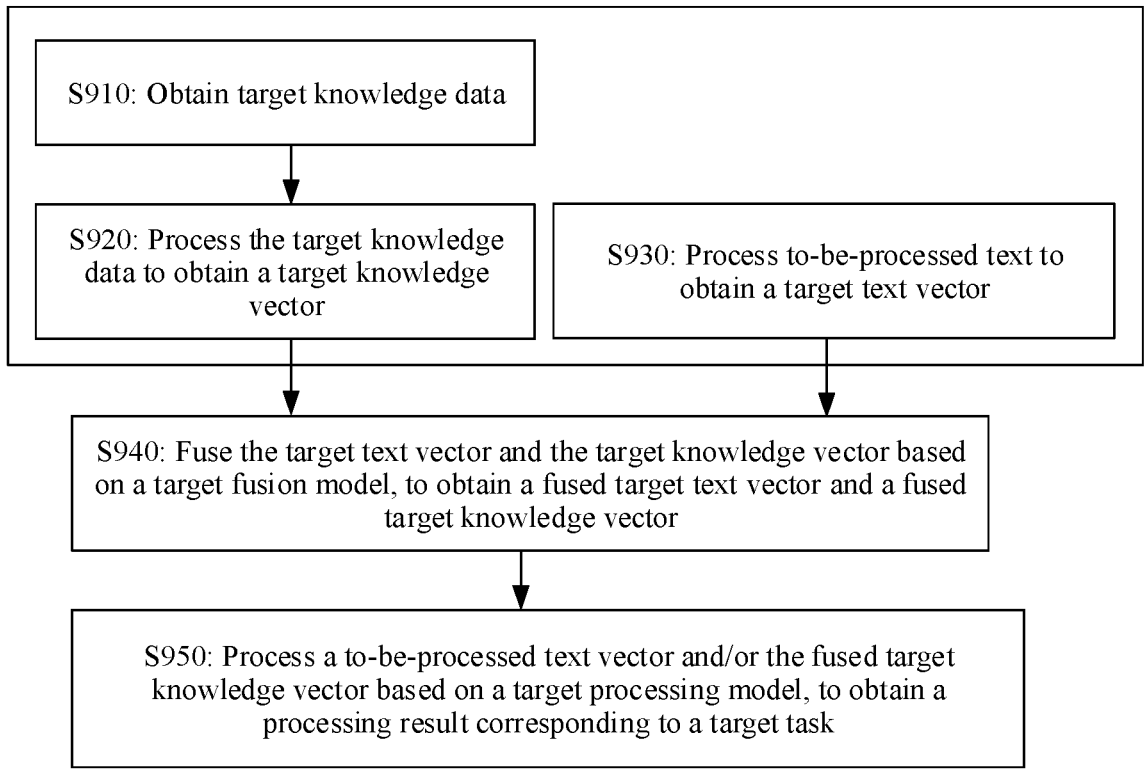
FIG. 9 is a schematic flowchart of a text processing method according to an embodiment of this application.

The foregoing describes, with reference to FIG. 8, the training method for a target processing model used for text processing provided in this application. The following describes, with reference to FIG. 9, a text processing method provided in this application. The text processing method in this embodiment of this application is an application of a target processing model. A method 900 may include step S910 to step S950.

In step S910, target knowledge data is obtained.

The target knowledge data includes a first named entity, a second named entity, and an association between the first named entity and the second named entity. The first named entity is included in to-be-processed text in step S930. It should be understood that, in this embodiment of this application, that the target knowledge data includes a first named entity, a second named entity, and an association between the first named entity and the second named entity is merely an example. The to-be-processed text may include a plurality of first named entities. In this case, the target knowledge data may include the plurality of first named entities, a plurality of second named entities, and associations between the plurality of first named entities and the plurality of second named entities, where the plurality of first named entities are in a one-to-one correspondence with the plurality of second named entities. For example, the target knowledge data may include a plurality of triples, and each triple includes one first named entity, one second named entity, and an association between the first named entity and the second named entity. In other words, the target knowledge data may include knowledge information related to an entity in the to-be-processed text, and the related knowledge described herein may be directly related or indirectly related knowledge.

The association between the first named entity and the second named entity is a relation between the first named entity and the second named entity; or the association between the first named entity and the second named entity is an attribute of the first named entity, and the second named entity is an attribute value of the attribute. In other words, the association between the first named entity and the second named entity may be represented based on a triple as (first named entity-relation-second named entity), or (first named entity-attribute-attribute value (that is, second named entity)).

Optionally, the first named entity, the second named entity, and the association between the first named entity and the second named entity correspond to a target task. In other words, knowledge including the first named entity, the second named entity, and the association between the first named entity and the second named entity corresponds to the target task.

The target knowledge data may be structured knowledge, for example, a structured knowledge base (such as an encyclopedia) or other knowledge information, or may be a text concept that can provide knowledge information. Both the structured knowledge and the text concept may be considered as the target knowledge data in this embodiment of this application.

The target knowledge data may include knowledge related to the to-be-processed text and the target task, or may include knowledge related to the to-be-processed text but not necessarily related to the target task.

The target knowledge data may be first knowledge data. In this case, the target knowledge data is obtained in a training phase. The target data may alternatively include first knowledge data and second knowledge data. In this case, the first knowledge data is obtained in a training phase, and the second knowledge data is obtained in a target processing model application phase. In other words, when the target processing model is applied to process the to-be-processed text, the second knowledge data may be further obtained. The second knowledge data is related (directly related or indirectly related) to the to-be-processed text. For example, the second knowledge data includes knowledge information such as attributes of a plurality of entities in the to-be-processed text or a relation between an entity and another entity.

It should be understood that a representation form of the target knowledge data is similar to that of the first knowledge data. For details, refer to the foregoing related description of the first knowledge data. For brevity, details are not described herein again.

In step S920, the target knowledge data is processed to obtain a target knowledge vector.

In this step, vectorization processing is performed on the target knowledge data represented by text, to obtain target knowledge data represented by a vector, that is, the target knowledge vector.

The target knowledge vector includes a vector corresponding to the first named entity, a vector corresponding to the second named entity, and a vector corresponding to the association between the first named entity and the second named entity. In other words, the target knowledge data may include knowledge information corresponding to the first named entity, knowledge information corresponding to the second named entity, and knowledge information corresponding to the association between the first named entity and the second named entity. When vectorization processing is performed, correspondingly, the knowledge information is converted into vectors, that is, the vector corresponding to the first named entity, the vector corresponding to the second named entity, and the vector corresponding to the association between the first named entity and the second named entity. It should be understood that, the first named entity, the second named entity, and the association between the first named entity and the second named entity are merely an example, and knowledge information expressed by the target knowledge data and knowledge information expressed by the target knowledge vector are the same, but representation forms are different.

A process of converting the target knowledge data into the target knowledge vector is similar to a process of converting the first knowledge data into the first knowledge vector. For details, refer to the foregoing description. Optionally, a neural network model for converting the target knowledge data into the target knowledge vector may be the same as a neural network model for converting the first knowledge data into the first knowledge vector, that is, a neural network model #A. The neural network model for converting the target knowledge data into the target knowledge vector may alternatively be a model obtained after parameters of the neural network model #A are adjusted in a training phase, that is, a trained neural network model #A.

In step S930, the to-be-processed text is processed to obtain a target text vector.

A processing process in this step is similar to a process of processing the training text to obtain the first text vector in step S840. For details, refer to the foregoing related description. Optionally, a neural network model for converting the to-be-processed text into the target text vector may be the same as a neural network model for converting the training text into the first text vector, that is, a neural network model #B. The neural network model for converting the to-be-processed text into the target text vector may alternatively be a model obtained after parameters of the neural network model #B are adjusted in a training phase, that is, a trained neural network model #B.

Optionally, before step S930, the text processing method provided in this embodiment of this application may further include: obtaining the to-be-processed text.

It should be noted that step S910 to step S930 are not subject to a specific sequence in this embodiment of this application.

In step S940, the target text vector and the target knowledge vector are fused based on a target fusion model, to obtain a fused target text vector and a fused target knowledge vector.

It should be understood that the fused target text vector is a to-be-processed text vector.

It should be understood that the fused target text vector and/or the fused target knowledge vector are/is data that is input into the target processing model to perform natural language task processing.

The fused target text vector includes at least a part of information in the target knowledge data, and the fused target knowledge vector includes semantic background information (which may also be referred to as semantic environment information or context information) of the to-be-processed text. In other words, the target text vector and the target knowledge vector are fused based on the target fusion model to obtain the fused target text vector and the fused target knowledge vector. The fused target text vector includes information about the to-be-processed text corresponding to the target text vector and at least a part of knowledge information in the target knowledge data corresponding to the target knowledge vector, and the at least a part of knowledge information in the target knowledge data is related to the to-be-processed text (for example, the fused target text vector includes knowledge such as attributes of the plurality of entities in the to-be-processed text or a relation between an entity and another entity). The fused target knowledge vector includes the target knowledge data corresponding to the target knowledge vector and the semantic environment information of the to-be-processed text corresponding to the target text vector (because an entity may have a plurality of meanings, meanings of the entity may be different in different semantic backgrounds, and the fused target knowledge vector may include context information of the entity in the to-be-processed text).

The target fusion model in this embodiment of this application may be an original fusion model whose parameters are not adjusted in a training phase, for example, a fusion model pre-trained in a pre-training process, or may be an original fusion model whose parameters are adjusted in a model training phase, for example, a fusion model that is trained in the model training phase and that is dedicated to the target processing model. A structure of the target fusion model is the same as a structure of the original fusion model, that is, the target fusion model may be a multilayer self-attention model, a multilayer perceptron model, a recurrent neural network model, a weight model, a convolutional neural network model, a generative adversarial network model, a reinforcement learning neural network model, or a model with another network structure.

A method in this step is similar to a method in step S850. For details, refer to the foregoing related description. Details are not described herein again.

In step S950, the fused target text vector and/or the fused target knowledge vector are/is processed based on the target processing model, to obtain a processing result corresponding to the target task.

In this embodiment of this application, the target processing model is a trained target processing model obtained after parameters of an original processing model are adjusted in a model training phase.

A processing process in this step is similar to that in step S860. For details, refer to the foregoing description.

Optionally, the to-be-processed text includes one or more named entities, and the one or more named entities include the first named entity. The to-be-processed text may further include at least one first knowledge identifier, and the first knowledge identifier is used to indicate at least one named entity in the one or more named entities in the to-be-processed text. The at least one first knowledge identifier is in a one-to-one correspondence with the at least one named entity in the one or more named entities in the to-be-processed text. It should be understood that, in this embodiment of this application, a first knowledge identifier used to indicate one named entity is understood as one first knowledge identifier. However, one first knowledge identifier may include two parts in a form. For example, the first knowledge identifier may be located on two sides of the entity to specify a range indicated by the entity. Correspondingly, in step S930, that the to-be-processed text is processed includes: The at least one first knowledge identifier is processed. After step S930, the obtained target text vector includes a vector corresponding to the at least one first knowledge identifier. Correspondingly, in step S940, the obtained fused target text vector includes at least one first knowledge identifier vector corresponding to the at least one first knowledge identifier, and the at least one first knowledge identifier vector is used to indicate a vector corresponding to the at least one named entity in the one or more named entities in the to-be-processed text. Correspondingly, in step S950, that the fused target text vector is processed based on the target processing model includes: The vector that corresponds to the at least one named entity and that is indicated by the at least one first knowledge identifier vector is processed based on the target processing model, to obtain the processing result corresponding to the target task. A first knowledge identifier vector guides the target processing model to focus on an entity indicated by a first knowledge identifier, so as to extract knowledge information (for example, a local knowledge feature), so that the target processing model can complete the target task by using a special identifier. This can improve target task processing efficiency. For example, if a first knowledge identifier exists on two sides of each of the plurality of entities in the to-be-processed text, when the target processing model processes the fused target text vector, the target processing model focuses on a vector corresponding to the first knowledge identifier, and extracts, based on the vector corresponding to the first knowledge identifier, an entity indicated by the first knowledge identifier, so as to process the entity.

In the technical solution of this application, the target fusion model fuses the target text vector corresponding to the to-be-processed text and the target knowledge vector corresponding to the target knowledge data. Doing so is equivalent to fusing the to-be-processed text and the target knowledge data. This enables the to-be-processed text to be fused with knowledge, so that semantic information is richer. When the obtained fused target text vector and/or the fused target knowledge vector are/is used as input data for the target processing model, because knowledge is fused into the to-be-processed text, a capability of understanding to-be-processed text information by the target processing model is improved when the target processing model performs the target task. Therefore, accuracy of the processing result of the target task is improved when the target task is processed. In other words, in this embodiment of this application, knowledge information is fused into the to-be-processed text, so that input for the target processing model is more accurate. This can improve a capability of understanding the to-be-processed text by the target processing model, and improve accuracy of the processing result of the target task.

A specific but non-limiting example of the text processing method provided in this application is described in detail below with reference to FIG. 10 to FIG. 12.

Figure 10:
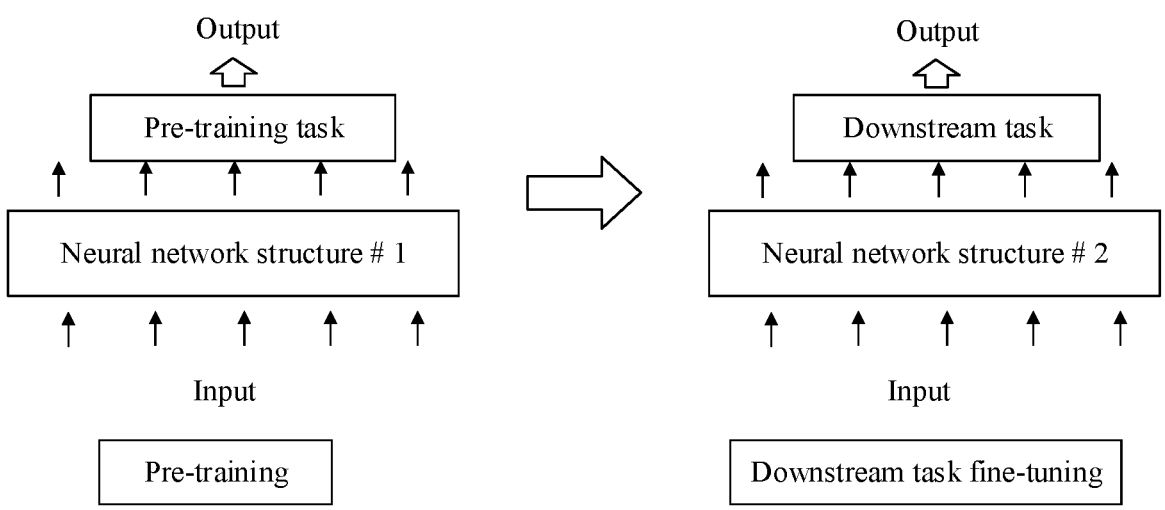
FIG. 10 is a schematic flowchart of an example of a model training method according to an embodiment of this application.

FIG. 10 is a schematic diagram of a pre-training model framework and a pre-training process. As shown in FIG. 10, for example, a training process of a target processing model may be divided into two phases: a pre-training phase and a downstream task fine-tuning phase. In the pre-training phase, a pre-training task corresponds to a task model of the pre-training task. In the downstream task fine-tuning phase, a downstream task corresponds to a task model of the downstream task, where the task model of the downstream task is an original processing model in this embodiment of this application.

In the pre-training phase, training data used for the pre-training process is input into a neural network structure #1 and the task model of the pre-training task as input data, and the task model of the pre-training task outputs a processing result accordingly. Parameters of the task model of the pre-training task and parameters of the neural network structure #1 may be adjusted based on a difference between the processing result output by the task model of the pre-training task and a correct result that corresponds to the pre-training task and the input data used for the training phase. If the difference between the processing result output by the task model of the pre-training task and the corresponding correct result becomes smaller and finally falls within a specific threshold, it may be considered that training of the task model of the pre-training task and the neural network structure #1 is completed. In the pre-training phase, after a trained neural network structure #1 is obtained, the neural network structure #1 may be stripped out. The trained neural network structure #1 may provide features for different downstream tasks. Alternatively, fine-tuning for another downstream task may be performed directly in the trained neural network structure #1.

In the downstream task fine-tuning phase, training data used for fine-tuning is input into a neural network structure #2 and the task model of the downstream task as input data, where the neural network structure #2 in the downstream task fine-tuning phase is the neural network structure #1 that has been trained in the pre-training phase. The task model of the downstream task outputs a processing result accordingly. Parameters of the task model of the downstream task may be adjusted based on a difference between the processing result output by the task model of the downstream task and a correct result that corresponds to the downstream task and the input data used for the training phase. If the difference between the processing result output by the task model of the downstream task and the corresponding correct result becomes smaller and finally falls within a specific threshold, it may be considered that training of the task model of the downstream task is completed. A trained task model of the downstream task herein is the target processing model in this embodiment of this application. In this case, the neural network structure #2 is mainly used to provide a feature for the task model of the downstream task, and the neural network structure #2 may be used to train task models of different downstream tasks. Optionally, in the downstream task fine-tuning phase, in addition to adjusting the parameters of the task model of the downstream task, parameters of the neural network structure #2 may be further adjusted accordingly. In other words, the parameters of the neural network structure that has been trained in the pre-training phase may be adjusted again in the downstream task fine-tuning phase. A neural network structure #2 obtained after parameter adjustment is adapted to the downstream task, and may be used as a dedicated neural network structure of the downstream task.

It should be noted that the pre-training task and the downstream task may be different or the same. Correspondingly, the training data used for pre-training and the training data used for fine-tuning may be different or the same. When the pre-training task and the downstream task are the same, the neural network structure #1 that has been trained in the pre-training phase may be considered as a network structure adapted to the downstream task. It should be understood that the neural network structure in this embodiment of this application may also be referred to as a neural network model.

Optionally, in the pre-training phase, the training data used for pre-training may be a large-scale text corpus. In this case, FIG. 10 is a schematic diagram of a training process of a large-scale pre-training language model, where the large-scale pre-training language model is the trained neural network structure #1 obtained in the pre-training phase.

Figure 11:
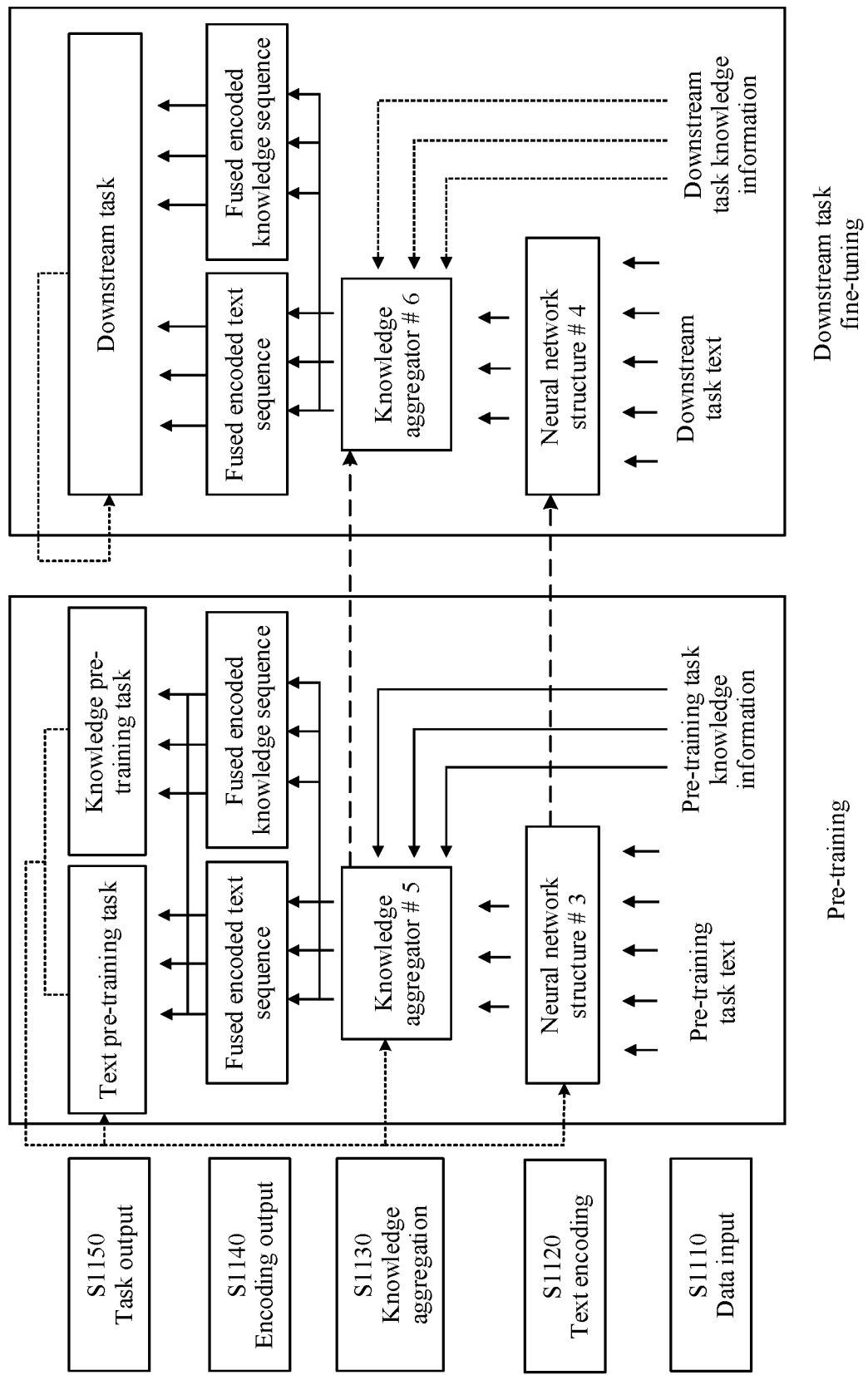
FIG. 11 is a schematic flowchart of another example of a model training method according to an embodiment of this application.
Figure 12:
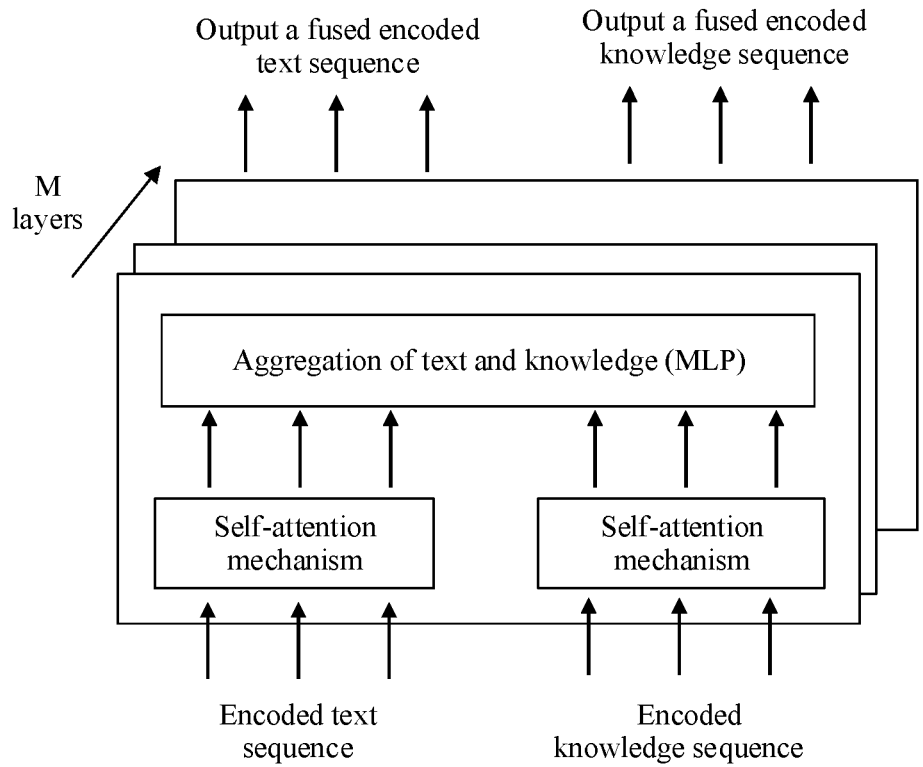
FIG. 12 is a schematic diagram of a neural network model according to an embodiment of this application.

FIG. 11 is a schematic block diagram of a text processing method according to an embodiment of this application. The method may be a specific example of the method 800.

For example, a training process of a target processing model in this embodiment of this application may be divided into two phases: a pre-training phase and a downstream task fine-tuning phase, as shown in FIG. 11.

Pre-Training Phase

In a data input step S1110, pre-training task text and pre-training task knowledge information are input as input data. A text corpus in the pre-training task text may be any text sequence that conforms to a language grammar rule, for example, news, an encyclopedia, a social media message, or a literary work. The pre-training task knowledge information may be a structured knowledge base such as an encyclopedia or other structured knowledge information, or may be a text entity concept (for example, a named entity such as an apple, a mobile phone, or the United States). Optionally, the pre-training task knowledge information may be the first knowledge data described above.

The pre-training task text is related to the pre-training task knowledge information. For example, the pre-training task text includes a plurality of entities (or referred to as named entities), and the pre-training task knowledge information includes knowledge about the plurality of entities, for example, attributes of the plurality of entities or a relation between each of the plurality of entities and another entity.

Optionally, if the pre-training task knowledge information is structured knowledge, before step S1110, the structured knowledge may be encoded by using an existing knowledge encoding method (for example, translating embedding, TransE), and obtained encoded information is used as knowledge for input. As shown in FIG. 11, the pre-training task knowledge information is encoded knowledge.

Optionally, if the pre-training task knowledge information is a text entity concept, text encoding may be performed on the pre-training task knowledge information, and a text encoding process may be performed before the data input step S1110 or after the data input step S1110.

Before step S1110, the method further includes: obtaining data. For example, a wiki corpus and knowledge base information may be downloaded from the wiki website. The wiki corpus may be used as the pre-training task text in this embodiment of this application, and the knowledge base information may be used as the pre-training task knowledge information in this embodiment of this application. Optionally, knowledge encoding is performed on the knowledge base information by using an existing knowledge encoding algorithm, and a knowledge form obtained after encoding is that each concept has one corresponding vector, and the vector may be referred to as a knowledge vector.

For example, obtained training data used for the pre-training phase may be as follows.

For example, the pre-training task text includes the entry apple:

An apple is a sweet, edible fruit produced by an apple tree (*Malus pumila*). Apple trees are cultivated worldwide and are the most widely grown species in the genus *Malus*. The tree originated in Central Asia, where its wild ancestor, *Malus sieversii*, is still found today. Apples have been grown for thousands of years in Asia and Europe and were brought to North America by European colonists. Apples have religious and mythological significance in many cultures, including Norse, Greek and European Christian traditions.

For example, the pre-training task knowledge information includes the knowledge apple:

200-dimensional knowledge vector: (0.223, −0.483, . . . , 0.576)

As mentioned above, the pre-training task knowledge information is related to the pre-training task text. For example, the pre-training task text may include the following text sequence, and pre-training task knowledge related to the text sequence may include knowledge about an entity in the following knowledge sequence.

For example, the text sequence is as follows: Apples have been grown for thousands of years in Asia and Europe and were brought to North America by European colonists.

For example, the knowledge sequence is as follows: Apple, Asia, Europe, North America, European colonists In a text encoding step S1120, the input pre-training task text is input into a neural network structure #3 for encoding, that is, the neural network structure #3 converts the pre-training task text into a text vector. The obtained text vector may include a text vector corresponding to an entire text sequence in the pre-training task text and/or a vector corresponding to each text unit in the text sequence. The neural network structure #3 may be a recurrent neural network structure, a self-attention transformer network structure, another network structure that can be used for text encoding, or the like. Optionally, if the pre-training task knowledge information is unstructured knowledge (for example, the pre-training task knowledge information is a knowledge concept), in this step, the pre-training task knowledge information may be encoded based on the neural network structure #3, that is, the pre-training task knowledge information is converted into a vector. Alternatively, the pre-training task knowledge information may be encoded based on another neural network structure, to obtain a corresponding knowledge vector.

In a knowledge aggregation step S1130, an encoded text sequence obtained in the text encoding step S1120 and an encoded knowledge sequence obtained in the data input step S1110 are input into a knowledge aggregator #5 for fusion, to obtain a new encoded text sequence with knowledge and a new encoded knowledge sequence for output. It should be understood that, in this embodiment of this application, the encoded text sequence is a text vector obtained after vectorization processing is performed on the pre-training task text, and the encoded knowledge sequence is a knowledge vector obtained after vectorization processing is performed on the pre-training task knowledge information. It should be further understood that the new encoded text sequence with knowledge and the new encoded knowledge sequence are a fused encoded text sequence and a fused encoded knowledge sequence that are obtained by fusing the encoded text sequence and the encoded knowledge sequence in the knowledge aggregator #5, that is, a fused text vector and a fused knowledge vector.

The knowledge aggregator #5 may have a complex multilayer network structure, for example, a multilayer self-attention mechanism network structure, a multilayer perceptron network structure, or a recurrent neural network structure, and may simply weight and average the encoded text sequence and the encoded knowledge sequence.

For example, in the knowledge aggregation step S1130, the knowledge aggregator #5 may first separately re-encode, by using a self-attention mechanism neural network, the text vector (that is, the encoded text sequence) corresponding to the pre-training task text and the knowledge vector (that is, the encoded knowledge sequence) corresponding to the pre-training task knowledge information; and then, fuse a re-encoded text sequence and a re-encoded knowledge sequence by using a multilayer perceptron neural network, to output, in a same format, a fused encoded text sequence and a fused encoded knowledge sequence (that is, a fused text vector and a fused knowledge vector). Optionally, the knowledge aggregator may have a multilayer structure, and output of an upper layer is input of a lower layer. A basic structure of the knowledge aggregator may be, for example, shown in FIG. 13.

In an encoding output step S1140, the fused encoded text sequence and the fused encoded knowledge sequence that are obtained in the knowledge aggregation step S1130 are output.

In a task output step S1150, the fused encoded text sequence and/or the fused encoded knowledge sequence that are/is output in the encoding output step S1140 are/is used for a specified pre-training task. In this embodiment of this application, there are two types of pre-training tasks. One is a text pre-training task (that is, a language model pre-training task), for example, a sequence probability prediction task or a classification task. The other is a knowledge pre-training task, for example, a named entity prediction task or a named entity classification task. The text pre-training task may enable the model to learn semantic information, and the knowledge pre-training task may enable the model to learn knowledge.

Optionally, in step S1150, the fused encoded text sequence may be used as input data for the text pre-training task and the knowledge pre-training task; the fused encoded knowledge sequence may be used as input data for the text pre-training task and the knowledge pre-training task; or the fused encoded text sequence may be used as input data for the text pre-training task, and the fused encoded knowledge sequence may be used as input data for the knowledge pre-training task. This is not specifically limited in this embodiment of this application. In specific implementation, this may be determined based on a type of the knowledge aggregator #5 and fusion of the encoded text sequence and the encoded knowledge sequence.

By way of example but not limitation, the text pre-training task may include token prediction and sentence pair classification. The token prediction is to randomly replace a token with a [mask] symbol at a specific probability during input, and finally use output token information in a context to predict which token the [mask] represents. The sentence pair classification is to input two sentences into a text sequence at a time, and finally use semantic coding of an output text sequence to perform classification, to determine whether the two sentences have a context relationship.

The token prediction is used as an example:

Original sentence: Harbin is the capital of Heilongjiang Province and is a famous international city of ice and snow culture.

Pre-training task: Ha [mask] bin is the capital of [mask] longjiang Province and is a famous [mask] city of ice and [mask] culture.

The knowledge pre-training task may be an entity prediction task. For example, for a knowledge sequence corresponding to a text sequence, a [mask] symbol is randomly used to replace a knowledge entity at a specific probability during input, and finally, output token information in a context is used to predict which knowledge entity the [mask] represents.

This embodiment of this application further includes a parameter adjustment step. A processing result of the text pre-training task and the knowledge pre-training task is output in the task output step S1150. Parameters of corresponding task modules in the text pre-training task and the knowledge pre-training task and parameters of the knowledge aggregator #5 and the neural network structure #3 are adjusted based on a difference between the processing result output in the task output step S1150 and a corresponding known correct result, so that the difference between the processing result output in the task output step and the corresponding correct result becomes smaller, and finally falls within a threshold range. In this way, the pre-training phase is completed.

After the pre-training phase is completed, a trained task model, a trained knowledge aggregator #5, and a trained neural network structure #3 of the pre-training task may be obtained. The knowledge aggregator #5 may be considered as an original fusion model in this embodiment of this application. When the pre-training task text is a large-scale text corpus, the knowledge aggregator #5 can learn rich semantic information and can include knowledge information. This improves a language understanding capability.

Downstream Task Fine-Tuning Phase

A process of the downstream task fine-tuning phase is similar to that of the pre-training phase. On the basis of the pre-training phase, in the downstream task phase, the trained neural network structure #3 and the trained knowledge aggregator #5 in the pre-training phase are reused to perform feature extraction to train a downstream task; or on the basis of pre-training, the trained neural network structure #3 and the trained knowledge aggregator #5 in the pre-training phase are fine-tuned to obtain a new neural network structure and a new knowledge aggregator that are adapted to a downstream task model. In this embodiment of this application, the trained neural network structure #3 is a neural network structure #4, and the trained knowledge aggregator #5 is a knowledge aggregator #6.

In the data input step S1110, downstream task text and downstream task knowledge information (the downstream task knowledge information is optional) are input as input data. A text corpus in the downstream task text may be any text sequence that conforms to a language grammar rule, for example, news, an encyclopedia, a social media message, or a literary work. The downstream task knowledge information may be a structured knowledge base such as an encyclopedia or other structured knowledge information, or may be a text entity concept (for example, a named entity such as an apple, a mobile phone, or the United States).

The downstream task knowledge information is related to the downstream task text. For example, the downstream task text includes a plurality of entities, and the downstream task knowledge information includes knowledge of the plurality about entities, for example, attributes of the plurality of entities or a relation between each of the plurality of entities and another entity. The downstream task text may also be related to the pre-training task knowledge information. For example, the pre-training knowledge information includes knowledge about a plurality of entities in the downstream task text. Optionally, when no downstream task knowledge information is input in the downstream task fine-tuning phase, the pre-training task knowledge information may be considered as the first knowledge data in the embodiments of this application; or when downstream task information is input in the downstream task fine-tuning phase, the pre-training task knowledge information and the downstream task knowledge information may be considered as the first knowledge data in the embodiments of this application. In this embodiment of this application, the pre-training task knowledge information and the downstream task knowledge information may be obtained in different phases. The downstream task text may be considered as the training text in the embodiments of this application, and the downstream task may be considered as the target task in the embodiments of this application.

Optionally, if the downstream task knowledge information is structured knowledge, before this step, the structured knowledge may be encoded by using the existing knowledge encoding method (for example, translating embedding, TransE), and obtained encoded information is used as knowledge for input. As shown in FIG. 11, the downstream task knowledge information is encoded knowledge. Optionally, if the downstream task knowledge information is a text entity concept, text encoding may be performed on the downstream task knowledge information, and a text encoding process may be performed before the data input step S1110 or after the data input step S1110.

Optionally, in this step, the input downstream task text may include a knowledge identifier, for example, the knowledge identifier is added on two sides of an entity to specify a range that is indicated by the entity. The knowledge identifier guides a model algorithm to focus and extract knowledge information. Encoding and fusion processing is also to be performed on the knowledge identifier in subsequent steps. This is similar to processing on text.

For example, the downstream task in this embodiment of this application may be an entity classification task or an entity relation extraction task. Entity classification is to classify an entity concept into an existing category, for example, classify an apple into a fruit category. Entity relation extraction is to classify a relation between two entities (a head entity and a tail entity) into an existing category, for example, [head entity: China, tail entity: Beijing, relation: capital].

For example, in the entity classification, an entity range may be indicated by using an [ENT] identifier, and the [ENT] identifier is input into a system:

[ENT] Zhejiang University [ENT] is located in [ENT] Hangzhou [ENT].

In this embodiment of this application, a knowledge identifier used to indicate one entity is considered as one knowledge identifier. For example, there are two [ENT] identifiers on two sides of Zhejiang University, but the two [ENT] identifiers indicate one entity Zhejiang University. The two [ENT] identifiers are considered as one knowledge identifier (which are also referred to as a pair of knowledge identifiers in some embodiments).

For another example, in the entity relation extraction task, the head entity may be identified by using [HD] and the tail entity may be identified by using [TL], and [HD] and [TL] are input into the system:

[HD] Zhejiang University [HD] is located in [TL] Hangzhou [TL].

Corresponding knowledge sequence: Zhejiang University. Hangzhou.

In the text encoding step S1120, the input downstream task text is input into the neural network structure #4 (that is, the neural network structure #3 that has been trained in the pre-training phase) for encoding, that is, the neural network structure #4 converts the downstream task text into a text vector. In other words, the neural network structure #3 that has been trained in the pre-training phase is reused in step S1120 of the downstream task fine-tuning phase. A process of processing the downstream task text in this step is similar to that in the pre-training phase. For details, refer to the foregoing description. In this step, if the downstream task text includes the knowledge identifier, in the text encoding process, the neural network structure #4 also encodes the knowledge identifier and outputs a corresponding vector.

The knowledge aggregator #5 that has been trained in the pre-training phase (that is, the knowledge aggregator #6) is reused in the knowledge aggregation step S1130. A processing process in this step is similar to that in the pre-training phase. For details, refer to the foregoing description.

Optionally, when no downstream task knowledge information is input, in step S1130, the knowledge aggregator #6 fuses an encoded text sequence corresponding to the downstream task text and the encoded knowledge sequence that corresponds to the pre-training task knowledge information and that is obtained in the pre-training phase, to obtain a fused encoded text sequence corresponding to the downstream task text and a fused encoded knowledge sequence corresponding to the pre-training task knowledge information. The fused encoded text sequence corresponding to the downstream task text includes at least a part of information in the pre-training task knowledge information, and the fused encoded knowledge sequence corresponding to the pre-training task knowledge information includes semantic background information of the downstream task text.

Optionally, when the downstream task knowledge information is input, in step S1130, the knowledge aggregator #6 fuses an encoded text sequence corresponding to the downstream task text and an encoded knowledge sequence corresponding to the downstream task knowledge information and the encoded knowledge sequence that corresponds to the pre-training task knowledge information and that is obtained in the pre-training phase, to obtain a fused encoded text sequence corresponding to the downstream task text and a fused encoded knowledge sequence corresponding to the downstream task knowledge information. The fused encoded text sequence corresponding to the downstream task text includes knowledge information, and the fused encoded knowledge sequence corresponding to the downstream task knowledge information includes semantic background information (or context information) of the downstream task.

In the encoding output step S1140, a new encoded text sequence with knowledge and a new encoded knowledge sequence that are obtained in the knowledge aggregation step are output.

In the task output step S1150, the new encoded text sequence with knowledge and the new encoded knowledge sequence that are output in the encoding output step are used for a specified downstream task. The downstream task is the target task in the embodiments of this application.

By way of example but not limitation, the downstream task is an entity classification task, and an overlay classifier model may be used to train the downstream task.

Optionally, when a classification result is output, classification may be performed in the following manner:

For example, classification is performed by using a corresponding output vector of an entity such as (Zhejiang University) in the text sequence.

For another example, classification is performed by using a corresponding output vector of the knowledge identifier [ENT].

For still another example, classification is performed by using corresponding output vectors of corresponding words such as (Zhejiang and University) in the text sequence.

By way of example but not limitation, the downstream task is an entity relation extraction task. Optionally, when a classification result is output, classification may be performed in the following manner:

For example, classification is performed by using a corresponding output vector of an entity pair such as (Zhejiang University and Hangzhou) in the text sequence.

For another example, classification is performed by using corresponding output vectors of the knowledge identifiers [HD] and [TL].

For still another example, classification is performed by using corresponding output vectors of corresponding words such as (Zhejiang, University, and Hangzhou) in the text sequence.

This embodiment of this application further includes a parameter adjustment step. A processing result of the downstream task is output in the task output step. Parameters of a corresponding task module in the downstream task may be adjusted based on a difference between the processing result output in the task output step and a corresponding known correct result, so that the difference between the processing result output in the task output step and the corresponding correct result becomes smaller, and finally falls within a threshold range. In this way, a trained task model of the downstream task, that is, the target task model in the embodiments of this application, is obtained.

Optionally, in the parameter adjustment step, in addition to adjusting the parameters of the corresponding task model in the downstream task, parameters of the neural network structure #4 and the knowledge aggregator #6 may be further adjusted, so as to obtain a neural network structure and a knowledge aggregator that are adapted to the task model of the downstream task.

When the parameters of the knowledge aggregator #6 are not adjusted in the downstream task fine-tuning phase, the knowledge aggregator #6 may be considered as the original fusion model and the target fusion model in the embodiments of this application. In other words, parameters of the original fusion model and the target fusion model are the same. When the parameters of the knowledge aggregator #6 are adjusted in the downstream task fine-tuning phase, the knowledge aggregator #6 before parameter adjustment may be considered as the original fusion model in the embodiments of this application, and the knowledge aggregator #6 after parameter adjustment may be considered as the target fusion model in the embodiments of this application.

Application Process of the Target Processing Model

The application process of the target processing model is similar to that in the steps in the downstream task fine-tuning phase. In the data input step S1110, optionally target task knowledge information related to to-be-processed text may be input. In step S1130, the knowledge aggregator may fuse an encoded text sequence corresponding to the to-be-processed text and the encoded knowledge sequence corresponding to the pre-training task knowledge information, the encoded knowledge sequence corresponding to the downstream task knowledge information, and an encoded knowledge sequence corresponding to the target task knowledge information. When no knowledge data is input in both the fine-tuning phase and the application phase, the pre-training task knowledge information obtained in the pre-training phase may be considered as the target knowledge data in the embodiments of this application. When no knowledge data is input in the application phase, the pre-training task knowledge information obtained in the pre-training phase and the downstream task knowledge information obtained in the fine-tuning phase may be considered as the target knowledge data in the embodiments of this application. When no knowledge data is input in the fine-tuning phase, the pre-training task knowledge information obtained in the pre-training phase and the target task knowledge information obtained in the application phase may be considered as the target knowledge data in the embodiments of this application. When knowledge data is input in all of the pre-training phase, the fine-tuning phase, and the application phase, the pre-training task knowledge information obtained in the pre-training phase, the downstream task knowledge information obtained in the fine-tuning phase, and the target task knowledge information obtained in the application phase may be considered as the target knowledge data in the embodiments of this application.

In the target processing model application phase, a processing result output by the target processing model is a final result, and there is no parameter adjustment step. Other steps are similar to those in the process in the downstream task fine-tuning phase. For details, refer to the foregoing description. For brevity, details are not described herein again.

Optionally, step S1110 may be performed by a data input module, and the data input module may be located, for example, at the I/O interface 112 in FIG. 4.

Optionally, step S1120 may be performed by a text encoding module, and the text encoding module may be, for example, the preprocessing module 113 or the preprocessing module 114 in FIG. 4.

Optionally, step S1130 may be performed by a knowledge aggregation module, and the knowledge aggregation module may be, for example, the preprocessing module 113 or the preprocessing module 114 in FIG. 4.

Optionally, step S1140 may be performed by an encoding output module, and the encoding output module may be integrated with the knowledge aggregation module.

Optionally, step S1150 may be performed by a task output module, and the task output module may be, for example, the task model of the downstream task in this embodiment of this application.

The foregoing describes in detail the method embodiments in the embodiments of this application with reference to FIG. 1 to FIG. 12. The following describes in detail apparatus embodiments in the embodiments of this application with reference to FIG. 13 and FIG. 14. It should be understood that the descriptions of the method embodiments correspond to descriptions of the apparatus embodiments. Therefore, for parts that are not described in detail, refer to the foregoing method embodiments.

Figure 13:
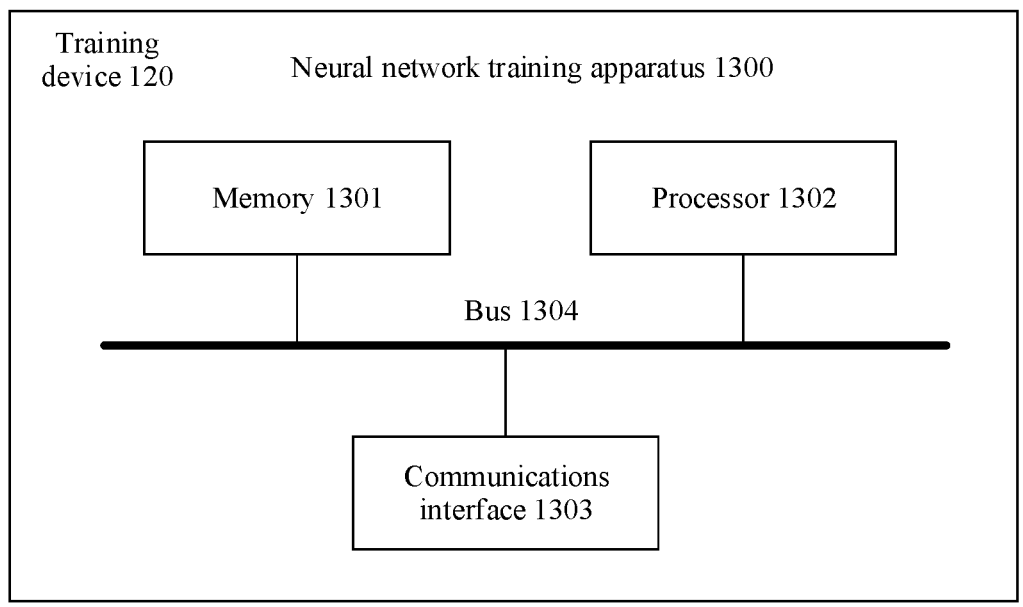
FIG. 13 is a schematic block diagram of a neural network training apparatus according to an embodiment of this application.

FIG. 13 is a schematic diagram of a hardware structure of a neural network training apparatus according to an embodiment of this application. A neural network training apparatus 1300 (the apparatus 1300 may be specifically a computer device) shown in FIG. 13 includes a memory 1301, a processor 1302, a communications interface 1303, and a bus 1304. Communication connections between the memory 1301, the processor 1302, and the communications interface 1303 are implemented through the bus 1304.

The memory 1301 may be a read only memory (ROM), a static storage device, a dynamic storage device, or a random access memory (RAM). The memory 1301 may store a program. When the program stored in the memory 1301 is executed by the processor 1302, the processor 1302 and the communications interface 1303 are configured to perform steps of the neural network training method in the embodiments of this application.

The processor 1302 may use a general-purpose central processing unit (CPU), a microprocessor, an application-specific integrated circuit (ASIC), a graphics processing unit (GPU), or one or more integrated circuits, and is configured to execute a related program, to implement a function that needs to be performed by a unit in the neural network training apparatus in this embodiment of this application, or perform the neural network training method in the method embodiment of this application.

The processor 1302 may alternatively be an integrated circuit chip and has a signal processing capability. In an implementation process, the steps of the neural network training method in this application may be completed by using a hardware integrated logic circuit in the processor 1302 or instructions in a form of software. The foregoing processor 1302 may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and accomplished by a hardware decoding processor, or may be performed and accomplished by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 1301. The processor 1302 reads information in the memory 1301, and implements, in combination with hardware of the processor 1302, the function that needs to be performed by the unit included in the neural network training apparatus in this embodiment of this application, or performs the neural network training method in the method embodiment of this application.

The communications interface 1303 uses a transceiving apparatus, for example, but not limited to, a transceiver, to implement communication between the apparatus 1300 and another device or a communications network. For example, training data (for example, the training text and the first knowledge data in the embodiments of this application) may be obtained through the communications interface 1303.

The bus 1304 may include a path for information transmission between various components (for example, the memory 1301, the processor 1302, and the communications interface 1303) of the apparatus 1300.

Figure 14:
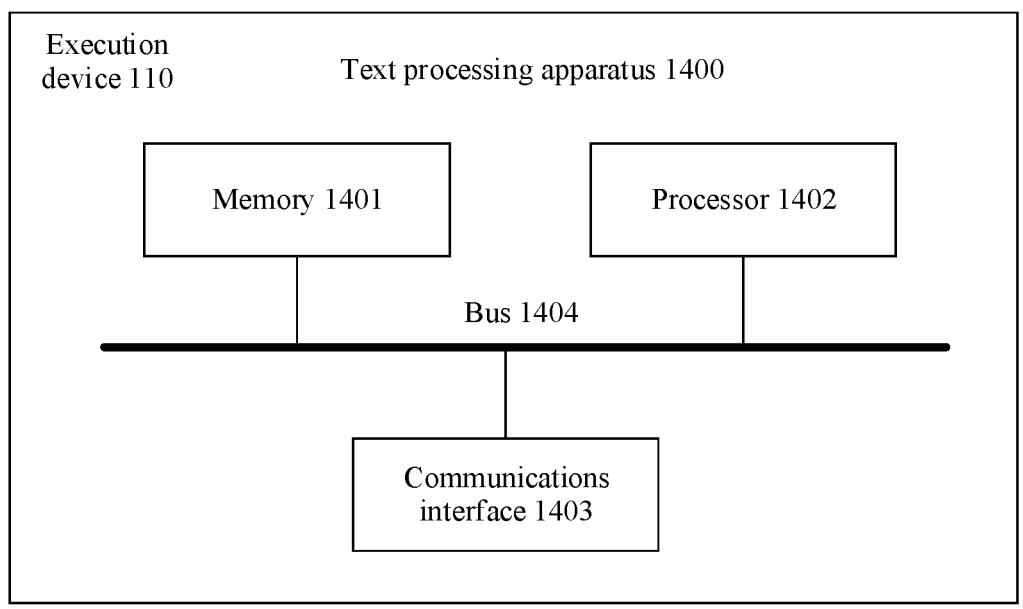
FIG. 14 is a schematic block diagram of a text processing apparatus according to an embodiment of this application.

FIG. 14 is a schematic diagram of a hardware structure of a text processing apparatus according to an embodiment of this application. A text processing apparatus 1400 (the apparatus 1400 may be specifically a computer device) shown in FIG. 14 includes a memory 1401, a processor 1402, a communications interface 1403, and a bus 1404. Communication connections between the memory 1401, the processor 1402, and the communications interface 1403 are implemented through the bus 1404.

The memory 1401 may be a ROM, a static storage device, or a RAM. The memory 1401 may store a program. When the program stored in the memory 1401 is executed by the processor 1402, the processor 1402 and the communications interface 1403 are configured to perform steps of the text processing method in the embodiment of this application.

The processor 1402 may use a general-purpose CPU, a microprocessor, an ASIC, a GPU, or one or more integrated circuits, and is configured to execute a related program, to implement a function that needs to be performed by a unit in the text processing apparatus in this embodiment of this application, or perform the text processing method in the method embodiment of this application.

The processor 1402 may alternatively be an integrated circuit chip and has a signal processing capability. In an implementation process, the steps of the text processing method in the embodiments of this application may be completed by using a hardware integrated logic circuit in the processor 1402 or instructions in a form of software. The foregoing processor 1402 may be a general-purpose processor, a DSP, an ASIC, an FPGA or another programmable logic device, a discrete gate or transistor logic device, or a discrete hardware component. The processor may implement or perform the methods, steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and accomplished by a hardware decoding processor, or may be performed and accomplished by a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 1401. The processor 1402 reads information in the memory 1401, and implements, in combination with hardware of the processor 1402, the function that needs to be performed by the unit included in the text processing apparatus in this embodiment of this application, or performs the text processing method in the method embodiment of this application.

The communications interface 1403 uses a transceiving apparatus, for example, but not limited to, a transceiver, to implement communication between the apparatus 1400 and another device or a communications network. For example, to-be-processed data may be obtained through the communications interface 1403.

The bus 1404 may include a path for information transmission between various components (for example, the memory 1401, the processor 1402, and the communications interface 1403) of the apparatus 1400.

It should be noted that although only the memory, the processor, and the communications interface of each of the apparatuses 1300 and 1400 shown in FIG. 13 and FIG. 14 are illustrated, in a specific implementation process, a person skilled in the art should understand that the apparatuses 1300 and 1400 each further include other components necessary for normal running. In addition, based on a specific requirement, a person skilled in the art should understand that the apparatuses 1300 and 1400 each may further include hardware components for implementing other additional functions. In addition, a person skilled in the art should understand that the apparatuses 1300 and 1400 each may alternatively include only components required for implementing the embodiments of this application, but not necessarily include all the components shown in FIG. 13 or FIG. 14.

It may be understood that the apparatus 1300 is equivalent to the training device 120 in FIG. 1, and the apparatus 1400 is equivalent to the execution device 110 in FIG. 1.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application may fall within the protection scope of this application. Therefore, the protection scope of this application shall be subject to the protection scope of the claims.

What is claimed is:

1. A text processing method, comprising:
   obtaining target knowledge data, wherein the target knowledge data comprises a first named entity, a second named entity, and an association between the first named entity and the second named entity;
   processing, through vectorization, the target knowledge data to obtain a target knowledge vector, wherein the target knowledge vector comprises a vector corresponding to the first named entity, a vector corresponding to the second named entity, and a vector corresponding to the association between the first named entity and the second named entity;
   processing, through vectorization, to-be-processed text to obtain a target text vector, wherein the to-be-processed text comprises one or more named entities, and the one or more named entities comprise the first named entity;
   fusing the target text vector and the target knowledge vector based on a target fusion model to obtain a fused target text vector and a fused target knowledge vector, wherein the fused target text vector comprises information about the to-be-processed text and at least a part of information in the target knowledge data, and wherein the fused target knowledge vector comprises the target knowledge data and semantic background information of the to-be-processed text; and
   processing the fused target text vector and/or the fused target knowledge vector based on a target processing model to obtain a processing result corresponding to a target task.

2. The method according to claim 1, wherein the to-be-processed text further comprises at least one first knowledge identifier, the at least one first knowledge identifier indicates at least one named entity in the one or more named entities in the to-be-processed text, and the at least one first knowledge identifier is in a one-to-one correspondence with the at least one named entity in the to-be-processed text.

3. The method according to claim 1, wherein:
   the association between the first named entity and the second named entity is a relation between the first named entity and the second named entity; or
   the association between the first named entity and the second named entity is an attribute of the first named entity, and the second named entity is an attribute value of the attribute.

4. The method according to claim 1, wherein the target fusion model comprises:
   a multilayer self-attention model, a multilayer perceptron model, a recurrent neural network model, a weight model, a convolutional neural network model, a generative adversarial network model, or a reinforcement learning neural network model.

5. The method according to claim 1, further comprising:
   obtaining first knowledge data, wherein the first knowledge data comprises a third named entity, a fourth named entity, and an association between the third named entity and the fourth named entity, and the target knowledge data comprises the first knowledge data;
   processing the first knowledge data to obtain a first knowledge vector, wherein the first knowledge vector comprises a vector corresponding to the third named entity, a vector corresponding to the fourth named entity, and a vector corresponding to the association between the third named entity and the fourth named entity;
   obtaining training text and a first task result that corresponds to the training text and the target task, wherein the training text comprises one or more named entities, and the one or more named entities comprise the third named entity;
   processing the training text to obtain a first text vector;
   fusing the first text vector and the first knowledge vector based on an original fusion model, to obtain a fused first text vector and a fused first knowledge vector;
   processing the fused first text vector and/or the fused first knowledge vector based on an original processing model, to obtain a second task result; and
   adjusting parameters of the original processing model based on the first task result and the second task result, to obtain the target processing model, and/or adjusting parameters of the original fusion model based on the first task result and the second task result, to obtain the target fusion model.

6. The method according to claim 5, wherein the fused first text vector comprises at least a part of information in the first knowledge data and the fused first knowledge vector comprises semantic background information of the training text.

7. The method according to claim 5, wherein the original fusion model is obtained through training based on the first knowledge data and preset pre-training text.

8. The method according to claim 1, wherein the target task is entity classification, and the target processing model is a classification model.

9. The method according to claim 1, wherein the target task is translation, and the target processing model is a translation model.

10. An apparatus, comprising:
    a memory configured to store a program; and
    a processor configured to execute the program stored in the memory, wherein based on the processor executing the program stored in the memory, the apparatus is configured to perform:
    obtaining target knowledge data, wherein the target knowledge data comprises a first named entity, a second named entity, and an association between the first named entity and the second named entity;

processing, through vectorization, the target knowledge data to obtain a target knowledge vector, wherein the target knowledge vector comprises a vector corresponding to the first named entity, a vector corresponding to the second named entity, and a vector corresponding to the association between the first named entity and the second named entity;

processing, through vectorization, to-be-processed text to obtain a target text vector, wherein the to-be-processed text comprises one or more named entities, and the one or more named entities comprise the first named entity;

fusing the target text vector and the target knowledge vector based on a target fusion model to obtain a fused target text vector and a fused target knowledge vector, wherein the fused target text vector comprises information about the to-be-processed text and at least a part of information in the target knowledge data, and wherein the fused target knowledge vector comprises the target knowledge data and semantic background information of the to-be-processed text; and processing the fused target text vector and/or the fused target knowledge vector based on a target processing model to obtain a processing result corresponding to a target task.

11. The apparatus according to claim 10, wherein the to-be-processed text further comprises at least one first knowledge identifier, the at least one first knowledge identifier indicates at least one named entity in the one or more named entities in the to-be-processed text, and the at least one first knowledge identifier is in a one-to-one correspondence with the at least one named entity in the to-be-processed text.

12. The apparatus according to claim 10, wherein:
the association between the first named entity and the second named entity is a relation between the first named entity and the second named entity; or
the association between the first named entity and the second named entity is an attribute of the first named entity, and the second named entity is an attribute value of the attribute.

13. The apparatus according to claim 10, wherein the target fusion model comprises:
a multilayer self-attention model, a multilayer perceptron model, a recurrent neural network model, a weight model, a convolutional neural network model, a generative adversarial network model, or a reinforcement learning neural network model.

* * * * *